US008364673B2

(12) United States Patent
Chang et al.

(10) Patent No.: US 8,364,673 B2
(45) Date of Patent: Jan. 29, 2013

(54) SYSTEM AND METHOD FOR DYNAMICALLY AND INTERACTIVELY SEARCHING MEDIA DATA

(75) Inventors: Shih-Fu Chang, New York, NY (US); Eric Zavesky, Hoboken, NJ (US)

(73) Assignee: The Trustees of Columbia University in the City of New York

( * ) Notice: Subject to any disclaimer, the term of this patent is extended or adjusted under 35 U.S.C. 154(b) by 99 days.

(21) Appl. No.: 12/969,101

(22) Filed: Dec. 15, 2010

(65) Prior Publication Data

US 2011/0145232 A1 Jun. 16, 2011

Related U.S. Application Data

(63) Continuation-in-part of application No. PCT/US2009/047492, filed on Jun. 16, 2009.

(60) Provisional application No. 61/132,358, filed on Jun. 17, 2008.

(51) Int. Cl.
*G06F 7/00* (2006.01)
*G06F 17/30* (2006.01)

(52) U.S. Cl. ...................................... 707/728
(58) Field of Classification Search ........................ None
See application file for complete search history.

(56) References Cited

U.S. PATENT DOCUMENTS

| 5,696,964 A | 12/1964 | Cox et al. |
| 4,649,380 A | 3/1987 | Penna |
| 4,712,248 A | 12/1987 | Hongo |
| 5,144,685 A | 9/1992 | Nasar et al. |
| 5,191,645 A | 3/1993 | Carlucci et al. |
| 5,204,706 A | 4/1993 | Saito |
| 5,208,857 A | 5/1993 | Lebrat |
| 5,262,856 A | 11/1993 | Lippman et al. |
| 5,408,274 A | 4/1995 | Chang et al. |
| 5,428,774 A | 6/1995 | Takahashi et al. |
| 5,461,679 A | 10/1995 | Normile et al. |
| 5,465,353 A | 11/1995 | Hull et al. |
| 5,488,664 A | 1/1996 | Shamir |
| 5,493,677 A | 2/1996 | Balogh et al. |
| 5,530,759 A | 6/1996 | Braudaway et al. |
| 5,546,571 A | 8/1996 | Shan et al. |
| 5,546,572 A | 8/1996 | Seto et al. |
| 5,555,354 A | 9/1996 | Strasnick et al. |

(Continued)

FOREIGN PATENT DOCUMENTS

| EP | 0579319 | 1/1994 |
| EP | 0587329 | 3/1994 |

(Continued)

OTHER PUBLICATIONS

Infotouch: An Explorative Multi-Touch Interface for Tagged Photo Collections. Linkoping University. Purportedly posted to Youtube on May 31, 2007 (http://www.youtube.com/watch?v=DHMJJwouq51).

(Continued)

*Primary Examiner* — Uyen T. Le
(74) *Attorney, Agent, or Firm* — Baker Botts, LLP

(57) ABSTRACT

Systems and methods for searching a database of media content wherein the user can dynamically and interactively perform searches and navigate search results. One or more search anchors are received, and at least one of the search anchors is associated with an anchor cell on a navigation map. One or more documents assigned to at least one cell on the navigation map can be determined, and the cells are populated with search results based at least in part on the search anchors. At least one of the documents is then displayed to a user.

23 Claims, 18 Drawing Sheets

U.S. PATENT DOCUMENTS

| | | | |
|---|---|---|---|
| 5,555,378 A | 9/1996 | Gelman et al. |
| 5,557,728 A | 9/1996 | Garrett et al. |
| 5,566,089 A | 10/1996 | Hoogenboom |
| 5,572,260 A | 11/1996 | Onishi et al. |
| 5,579,444 A | 11/1996 | Dalziel et al. |
| 5,579,471 A | 11/1996 | Barber et al. |
| 5,605,655 A | 2/1997 | Ishihara et al. |
| 5,606,655 A | 2/1997 | Arman et al. |
| 5,613,032 A | 3/1997 | Cruz et al. |
| 5,615,112 A | 3/1997 | Liu Sheng et al. |
| 5,617,119 A | 4/1997 | Briggs et al. |
| 5,623,690 A | 4/1997 | Palmer et al. |
| 5,630,121 A | 5/1997 | Braden-Harder et al. |
| 5,642,477 A | 6/1997 | de Carmo et al. |
| 5,655,117 A | 8/1997 | Goldberg et al. |
| 5,664,018 A | 9/1997 | Leighton |
| 5,664,177 A | 9/1997 | Lowry |
| 5,668,897 A | 9/1997 | Stolfo |
| 5,684,715 A | 11/1997 | Palmer |
| 5,694,334 A | 12/1997 | Donahue et al. |
| 5,694,945 A | 12/1997 | Ben-Haim |
| 5,701,510 A | 12/1997 | Johnson et al. |
| 5,708,805 A | 1/1998 | Okamoto et al. |
| 5,713,021 A | 1/1998 | Kondo et al. |
| 5,721,815 A | 2/1998 | Ottesen et al. |
| 5,724,484 A | 3/1998 | Kagami et al. |
| 5,734,752 A | 3/1998 | Knox |
| 5,734,893 A | 3/1998 | Li et al. |
| 5,742,283 A | 4/1998 | Kim |
| 5,751,286 A | 5/1998 | Barber et al. |
| 5,758,076 A | 5/1998 | Wu et al. |
| 5,767,922 A | 6/1998 | Zabih et al. |
| 5,768,578 A | 6/1998 | Kirk et al. |
| 5,794,178 A | 8/1998 | Caid et al. |
| 5,794,242 A | 8/1998 | Green et al. |
| 5,790,703 A | 9/1998 | Wang |
| 5,802,361 A | 9/1998 | Wang et al. |
| 5,805,733 A | 9/1998 | Wang et al. |
| 5,805,804 A | 9/1998 | Laursen et al. |
| 5,809,139 A | 9/1998 | Girod et al. |
| 5,809,160 A | 9/1998 | Powell et al. |
| 5,821,945 A | 10/1998 | Yeo et al. |
| 5,822,524 A | 10/1998 | Chen et al. |
| 5,825,892 A | 10/1998 | Braudaway et al. |
| 5,848,155 A | 12/1998 | Cox |
| 5,852,435 A | 12/1998 | Vigneaux et al. |
| 5,852,823 A | 12/1998 | De Bonet |
| 5,870,754 A | 2/1999 | Dimitrova et al. |
| 5,873,080 A | 2/1999 | Coden et al. |
| 5,884,298 A | 3/1999 | Smith et al. |
| 5,887,061 A | 3/1999 | Sato |
| 5,893,095 A | 4/1999 | Jain et al. |
| 5,915,027 A | 6/1999 | Cox et al. |
| 5,930,783 A | 7/1999 | Li et al. |
| 5,937,422 A | 8/1999 | Nelson et al. |
| 5,943,422 A | 8/1999 | Van Wie et al. |
| 5,949,885 A | 9/1999 | Leighton |
| 5,960,081 A | 9/1999 | Vynne et al. |
| 5,963,203 A | 10/1999 | Goldberg et al. |
| 5,969,755 A | 10/1999 | Courtney |
| 5,983,218 A | 11/1999 | Syeda-Mahmood |
| 5,987,459 A | 11/1999 | Swanson et al. |
| 5,995,095 A | 11/1999 | Ratakonda |
| 5,995,978 A | 11/1999 | Cullen et al. |
| 6,031,914 A | 2/2000 | Tewfik et al. |
| 6,037,984 A | 3/2000 | Isanardi et al. |
| 6,041,079 A | 3/2000 | Yim |
| 6,047,374 A | 4/2000 | Barton |
| 6,058,186 A | 5/2000 | Enari |
| 6,058,205 A | 5/2000 | Bahl et al. |
| 6,064,764 A | 5/2000 | Bhaskaran et al. |
| 6,070,167 A | 5/2000 | Qian et al. |
| 6,070,228 A | 5/2000 | Belknap et al. |
| 6,072,542 A | 6/2000 | Wilcox et al. |
| 6,075,875 A | 6/2000 | Gu |
| 6,078,664 A | 6/2000 | Moskowitz et al. |
| 6,079,566 A | 6/2000 | Eleftheriadis et al. |
| 6,081,278 A | 6/2000 | Chen |
| 6,092,072 A | 7/2000 | Guha et al. |
| 6,100,930 A | 8/2000 | Kolczynski |
| 6,104,411 A | 8/2000 | Ito et al. |
| 6,108,434 A | 8/2000 | Cox et al. |
| 6,115,717 A | 9/2000 | Mehrotra et al. |
| 6,122,403 A | 9/2000 | Rhoads |
| 6,125,229 A | 9/2000 | Dimitrova et al. |
| 6,154,755 A | 11/2000 | Dellert et al. |
| 6,157,746 A | 12/2000 | Sodagar et al. |
| 6,172,675 B1 | 1/2001 | Ahmad et al. |
| 6,178,416 B1 | 1/2001 | Thompson et al. |
| 6,185,329 B1 | 2/2001 | Zhang et al. |
| 6,195,458 B1 | 2/2001 | Warnick et al. |
| 6,208,735 B1 | 3/2001 | Cox et al. |
| 6,208,746 B1 | 3/2001 | Florencio et al. |
| 6,222,932 B1 | 4/2001 | Rao et al. |
| 6,223,183 B1 | 4/2001 | Smith et al. |
| 6,236,395 B1 | 5/2001 | Sezan et al. |
| 6,240,424 B1 | 5/2001 | Hirata |
| 6,243,419 B1 | 6/2001 | Satou et al. |
| 6,246,804 B1 | 6/2001 | Sato et al. |
| 6,252,975 B1 | 6/2001 | Bozdagi et al. |
| 6,269,358 B1 | 7/2001 | Hirata |
| 6,275,599 B1 | 8/2001 | Adler et al. |
| 6,282,299 B1 | 8/2001 | Tewfik et al. |
| 6,282,300 B1 | 8/2001 | Bloom et al. |
| 6,285,995 B1 | 9/2001 | Abdel-Mottaleb et al. |
| 6,297,797 B1 | 10/2001 | Takeuchi et al. |
| 6,327,390 B1 | 12/2001 | Sun et al. |
| 6,332,030 B1 | 12/2001 | Manjunath et al. |
| 6,339,450 B1 | 1/2002 | Chang et al. |
| 6,356,309 B1 | 3/2002 | Masaki et al. |
| 6,360,234 B2 | 3/2002 | Jain et al. |
| 6,366,314 B1 | 4/2002 | Goudezeune et al. |
| 6,366,701 B1 | 4/2002 | Chalom et al. |
| 6,385,329 B1 | 5/2002 | Sharma et al. |
| 6,385,602 B1 | 5/2002 | Tso et al. |
| 6,393,394 B1 | 5/2002 | Ananthapadmanabhan et al. |
| 6,404,925 B1 | 6/2002 | Foote et al. |
| 6,418,232 B1 | 7/2002 | Nakano et al. |
| 6,418,421 B1 | 7/2002 | Hurtado et al. |
| 6,442,538 B1 | 8/2002 | Nojima |
| 6,453,053 B1 | 9/2002 | Wakasu |
| 6,466,940 B1 | 10/2002 | Mills |
| 6,473,459 B1 | 10/2002 | Sugano et al. |
| 6,476,814 B1 | 11/2002 | Garvey |
| 6,487,301 B1 | 11/2002 | Zhao |
| 6,499,105 B1 | 12/2002 | Yoshiura et al. |
| 6,526,099 B1 | 2/2003 | Christopoulos et al. |
| 6,532,541 B1 | 3/2003 | Chang et al. |
| 6,546,135 B1 | 4/2003 | Lin et al. |
| 6,549,911 B2 | 4/2003 | Gustman |
| 6,556,695 B1 | 4/2003 | Packer et al. |
| 6,556,958 B1 | 4/2003 | Chickering |
| 6,560,284 B1 | 5/2003 | Girod et al. |
| 6,567,805 B1 | 5/2003 | Johnson et al. |
| 6,581,058 B1 | 6/2003 | Fayyad et al. |
| 6,606,329 B1 | 8/2003 | Herrmann |
| 6,606,393 B1 | 8/2003 | Xie et al. |
| 6,628,824 B1 | 9/2003 | Belanger |
| 6,643,387 B1 | 11/2003 | Sethuraman et al. |
| 6,654,931 B1 | 11/2003 | Haskell et al. |
| 6,678,389 B1 | 1/2004 | Sun et al. |
| 6,683,966 B1 | 1/2004 | Tian et al. |
| 6,700,935 B2 | 3/2004 | Lee |
| 6,701,309 B1 | 3/2004 | Beeferman et al. |
| 6,708,055 B2 | 3/2004 | Geiser et al. |
| 6,714,909 B1 | 3/2004 | Gibbon et al. |
| 6,716,175 B2 | 4/2004 | Geiser et al. |
| 6,718,047 B2 | 4/2004 | Rhoads |
| 6,721,733 B2 | 4/2004 | Lipson et al. |
| 6,725,372 B1 | 4/2004 | Lewis et al. |
| 6,735,253 B1 | 5/2004 | Chang et al. |
| 6,741,655 B1 | 5/2004 | Chang et al. |
| 6,757,407 B2 | 6/2004 | Bruckstein et al. |
| 6,778,223 B2 | 8/2004 | Abe |
| 6,792,434 B2 | 9/2004 | Moghaddam et al. |
| 6,807,231 B1 | 10/2004 | Wiegand et al. |
| 6,816,836 B2 | 11/2004 | Basu et al. |

| | | |
|---|---|---|
| 6,847,980 B1 | 1/2005 | Benitez et al. |
| 6,879,703 B2 | 4/2005 | Lin et al. |
| 6,886,013 B1 | 4/2005 | Beranek |
| 6,940,910 B2 | 9/2005 | Jun et al. |
| 6,941,325 B1 | 9/2005 | Benitez et al. |
| 6,950,542 B2 | 9/2005 | Roesch |
| 6,970,602 B1 | 11/2005 | Smith et al. |
| 7,010,751 B2 | 3/2006 | Shneiderman |
| 7,072,398 B2 | 7/2006 | Ma |
| 7,103,225 B2 | 9/2006 | Yang et al. |
| 7,143,434 B1 | 11/2006 | Paek et al. |
| 7,145,946 B2 | 12/2006 | Lee |
| 7,154,560 B1 | 12/2006 | Chang et al. |
| 7,184,959 B2 | 2/2007 | Gibbon et al. |
| 7,185,049 B1 | 2/2007 | Benitez et al. |
| 7,254,285 B1 | 8/2007 | Paek et al. |
| 7,308,443 B1 | 12/2007 | Lee et al. |
| 7,313,269 B2 | 12/2007 | Xie et al. |
| 7,327,885 B2 | 2/2008 | Divakaran et al. |
| 7,339,992 B2 | 3/2008 | Chang et al. |
| 7,386,806 B2 | 6/2008 | Wroblewski |
| 7,398,275 B2 | 7/2008 | Rising et al. |
| 7,403,302 B2 | 7/2008 | Gann |
| 7,406,409 B2 | 7/2008 | Otsuka et al. |
| 7,409,144 B2 | 8/2008 | McGrath et al. |
| 7,437,004 B2 | 10/2008 | Baatz et al. |
| 7,496,830 B2 * | 2/2009 | Rubin et al. ............... 715/206 |
| 7,519,217 B2 | 4/2009 | Liu et al. |
| 7,624,337 B2 | 11/2009 | Sull et al. |
| 7,636,662 B2 | 12/2009 | Dimtrva et al. |
| 7,653,635 B1 | 1/2010 | Paek et al. |
| 7,676,820 B2 | 3/2010 | Snijder et al. |
| 7,720,851 B2 | 5/2010 | Chang et al. |
| 7,733,956 B1 | 6/2010 | Kalra et al. |
| 7,738,550 B2 | 6/2010 | Kuhn |
| 7,756,338 B2 | 7/2010 | Wilson et al. |
| 7,773,813 B2 | 8/2010 | Hua et al. |
| 7,809,192 B2 | 10/2010 | Gokturk et al. |
| 7,817,722 B2 | 10/2010 | Chang et al. |
| 7,817,855 B2 | 10/2010 | Yuille et al. |
| 7,996,762 B2 | 8/2011 | Qi et al. |
| 8,010,296 B2 | 8/2011 | Loo et al. |
| 8,135,221 B2 | 3/2012 | Jiang et al. |
| 8,218,617 B2 | 7/2012 | Kim et al. |
| 2001/0000962 A1 | 5/2001 | Rajan |
| 2002/0021828 A1 | 2/2002 | Papier et al. |
| 2002/0118748 A1 | 8/2002 | Inomata et al. |
| 2002/0157116 A1 | 10/2002 | Jaisinschi |
| 2002/0169771 A1 | 11/2002 | Melmon et al. |
| 2003/0013951 A1 | 1/2003 | Stefanescu et al. |
| 2003/0046018 A1 | 3/2003 | Kohlmorgen et al. |
| 2003/0195883 A1 | 10/2003 | Mojsilovic et al. |
| 2003/0229278 A1 | 12/2003 | Sinha |
| 2004/0057081 A1 | 3/2004 | Kubota |
| 2004/0131121 A1 | 7/2004 | Dumitras et al. |
| 2004/0210819 A1 * | 10/2004 | Alonso ............... 715/500 |
| 2005/0076055 A1 | 4/2005 | Mory et al. |
| 2005/0201619 A1 | 9/2005 | Sun et al. |
| 2005/0210043 A1 | 9/2005 | Manasse |
| 2005/0238238 A1 | 10/2005 | Xu et al. |
| 2006/0026588 A1 | 2/2006 | Illowsky et al. |
| 2006/0167784 A1 | 7/2006 | Hoffberg |
| 2006/0200260 A1 | 9/2006 | Hoffberg et al. |
| 2006/0206882 A1 | 9/2006 | Illowsky et al. |
| 2006/0258419 A1 | 11/2006 | Winkler et al. |
| 2006/0293921 A1 | 12/2006 | McCarthy et al. |
| 2007/0033170 A1 | 2/2007 | Sull et al. |
| 2007/0038612 A1 | 2/2007 | Sull et al. |
| 2007/0044010 A1 | 2/2007 | Sull et al. |
| 2007/0078846 A1 | 4/2007 | Gulli et al. |
| 2007/0087756 A1 | 4/2007 | Hoffberg |
| 2007/0174790 A1 | 7/2007 | Jing et al. |
| 2007/0195106 A1 | 8/2007 | Lin et al. |
| 2007/0237426 A1 | 10/2007 | Xie et al. |
| 2007/0245400 A1 | 10/2007 | Paek et al. |
| 2008/0055479 A1 | 3/2008 | Shehata et al. |
| 2008/0097939 A1 | 4/2008 | Guyon et al. |
| 2008/0181308 A1 | 7/2008 | Wang et al. |
| 2008/0193016 A1 | 8/2008 | Lim et al. |
| 2008/0222670 A1 | 9/2008 | Lee et al. |
| 2008/0266300 A1 | 10/2008 | Deering et al. |
| 2008/0298464 A1 | 12/2008 | Hinz et al. |
| 2008/0303942 A1 | 12/2008 | Chang et al. |
| 2009/0055094 A1 * | 2/2009 | Suzuki ............... 701/209 |
| 2009/0290635 A1 | 11/2009 | Kim et al. |
| 2009/0316778 A1 | 12/2009 | Kim et al. |
| 2010/0172591 A1 | 7/2010 | Ishikawa |
| 2011/0025710 A1 | 2/2011 | Kennedy et al. |
| 2011/0064136 A1 | 3/2011 | Chang et al. |
| 2011/0093492 A1 | 4/2011 | Sull et al. |
| 2011/0255605 A1 | 10/2011 | Chang et al. |
| 2011/0314367 A1 | 12/2011 | Chang et al. |

FOREIGN PATENT DOCUMENTS

| | | |
|---|---|---|
| EP | 0953938 | 11/1999 |
| JP | 2004049471 | 2/1992 |
| JP | 1996317384 | 11/1996 |
| WO | WO98/33323 | 7/1998 |
| WO | WO00/28440 | 5/2000 |
| WO | WO00/49797 | 8/2000 |

OTHER PUBLICATIONS

Zavesky, E. and Chang, S.-F., "CuZero: Low-Latency Query Formulation and Result Exploration for Concept-Based Visual Search," ACM Multimedia Information Retrieval Conference, Oct. 2008, Vancouver, Canada.

"Motion Recovery for Video Contect Classification," Dimitrova and Forouzan Golshani, Arizona State University, Tempe; Transactions on Information Systems, pp. 408-439; Oct. 13, 1995; No. 4, New York, NY, U.S.A.

Chang, S.-F. et al. VideoQ: An Automated Content-Based Video Search System Using Visual Cues. Proceedings ACM Multimedia 97, Seattle, WA, Nov. 9-13, 1997, pp. 313-324.

Chang, S.-F. Content-Based Indexing and Retrieval of Visual Information. IEEE Signal Processing Magazine. Jul. 1997, vol. 14, No. 4, pp. 45-48.

Li, W. et al. Vision: A Digital Video Library, Proceedings of the 1st ACM International Conference on Digital Libraries, Bethesda, MD, Mar. 20-23, 1996, pp. 19-27.

Gong Y. et al. A Generic Video Parsing System with a Scene Description Language (SDL). Real-Time Imaging, Feb. 1996, vol. 2, No. 1, pp. 45-49.

Russ, John C. The Image Processing Handbook. Boca Raton, Florida: CRC Press. 1995, 2nd ed., pp. 361-376.

Bayram et al.: "Image Manipulation Detection," Journal of Electronic Imaging 15(4), 041102 (Oct.-Dec. 2006).

Fridich et al.: "Detection of Copy-Move Forgery in Digital Images," Proc. of DFWRS 2003, Cleveland, OH, USA, Aug. 5-8, 2003.

Multimedia Search and Retrieval, Shih-Fu Chang, Qain Huang, Thomas Huang, Atul Puri, and Behzad Shaharaay; Published as a chapter in Advances in Multimedia: System, Standard, and Networks, A. Puri and T. Chen (eds.). New York: Marcel Dekker, 1999.

AMOS: An Active System for MPEG-4 Video Object Segmentation, Di Zhong and Shih-Chang, 647-651, o-8186-8821-1/98 (c) 1998 IEEE.

Tonomura et al. (1990) "Content Oriented Visual Interface Using Video Icons for Visual Database Systems," Journal of Visual Languages and Computing, pp. 183-198.

Gunsel et al. (1998) "Temporal Video Segmentation Using Unsupervised Clustering and Semantic Object Tracking," Journal of Electronic Imaging 7(3), pp. 592-604.

Yoshinobu Tonomura (1991) "Video Handling Based on Structured Information for Hypermedia Systems," Proceedings of the International Conference on Multimedia Information Systems, pp. 333-344.

Gong et al. (1995) "Automatic Parsing of TV Soccer Programs," IEEE, pp. 167-174.

John R. Smith (1999) "Digital Video Libraries and the Internet," IEEE, pp. 92-97.

W. Niblack et al., "The QBIC Project: Querying Images by Content Using Color, Texture, and Shape," in Storage and Retrieval for Image and Video Databases, Wayne Niblack, Editor, Proc. SPIE 1908, pp. 173-187 (1993).

Chabane Djeraba and Marinette Bouet "Digital Information Retrieval," Copyright 1997 ACM 0-89791-970-x/97/11 pp. 185-192.
Tong et al., "RUBRIC—An Environment for Full Text Information Retrieval," ACM, Jun. 1985, pp. 243-251.
Hjelsvold et al., "Searching and Browsing a Shared Video Database," IEEE, Aug. 1995, pp. 90-98.
M. Bierling, "Displacement Estimation by Hierarchical Block Matching," 1001 SPIE Visual Commun. & Image Processing (1988).
Del Bimbo et al., "Visual Image Retrieval by Elastic Matching of User Sketches," 19 IEEE Trans. on PAMI (1997) pp. 121-123.
Hirata et al., "Query by Visual Example, Content Based Image Retrieval, Advances in Database Technology—EDBT," 580 Lecture Notes on Computer Science (1992, A. Pirotte et al. eds.).
Jacobs et al., "Fast Multiresolution Image Querying," Proc of SIGGRAPH, Los Angeles (Aug. 1995) pp. 277-286.
Kato et al., "Sketch Retrieval Method for Full Color Image Database—Query by Visual Example," Electro Technical Laboratory, MIDI, Tsukuba 305, Japan, IEEE (1992) pp. 530-532.
T. Minka, "An Image Database Browed that Learns from User Interaction," MIT Media Laboratory Perceptual Computing Section, TR #365 (1996).
Netravali et al., Digital Pictures: Representation, Compression, and Standards, 2d. Ed., Plenum Press, New York and London (1995) pp. 340-344.
Saber et al., "Region-based affine shape matching for automatic image annotation and query-by-example," 8 Visual COmm. and Image Representation (1997) pp. 3-20.
U.S. Appl. No. 09/423,409, filed Feb. 22, 2000.
U.S. Appl. No. 09/423,409, Non-Final Rejection dated Dec. 10, 2002.
U.S. Appl. No. 09/423,409, Response to Non-Final Rejection dated Jun. 2, 2003.
U.S. Appl. No. 09/423,409, Final Rejection dated Aug. 7, 2003.
U.S. Appl. No. 09/423,409, Amendment After Final dated Nov. 6, 2003.
U.S. Appl. No. 09/423,409, Notice of Allowance dated Nov. 21, 2003.
U.S. Appl. No. 10/333,030, filed Jun. 6, 2003.
U.S. Appl. No. 10/333,030, Non-Final Rejection dated Dec. 20, 2006.
U.S. Appl. No. 10/333,030, Response to Non-Final Rejection dated Mar. 20, 2007.
U.S. Appl. No. 10/333,030, Non-Final Rejection dated Apr. 30, 2007.
U.S. Appl. No. 10/333,030, Response to Non-Final Rejection dated Aug. 28, 2007.
U.S. Appl. No. 10/333,030, Final Rejection dated Oct. 25, 2007.
U.S. Appl. No. 10/333,030, Response to Final Rejection and RCE dated Jan. 24, 2008.
U.S. Appl. No. 10/333,030, Notice of Non-comliant Amendment dated Feb. 15, 2008.
U.S. Appl. No. 10/333,030, Response to Non-Final Rejection dated Apr. 15, 2008.
U.S. Appl. No. 10/333,030, Non-Final Rejection dated May 22, 2008.
U.S. Appl. No. 10/333,030, Response to Non-Final Rejection dated Nov. 21, 2008.
U.S. Appl. No. 10/333,030, Final Rejection dated Feb. 26, 2009.
U.S. Appl. No. 10/333,030, Examiner Interview Summary dated Jul. 2, 2009.
U.S. Appl. No. 10/333,030, Response to Final Rejection and RCE dated Jul. 9, 2009.
U.S. Appl. No. 10/333,030, Non-Final Rejection dated Sep. 22, 2009.
U.S. Appl. No. 09/423,770, filed Mar. 20, 2000.
U.S. Appl. No. 09/423,770, Final Rejection dated Jul. 2, 2003.
U.S. Appl. No. 09/423,770, Response to Non-Final Rejection dated May 29, 2003.
U.S. Appl. No. 09/423,770, Non-Final Rejection dated Dec. 2, 2002.
U.S. Appl. No. 09/623,277, filed Feb. 26, 2001.
U.S. Appl. No. 09/623,277, Restriction Requirement dated Aug. 10, 2005.
U.S. Appl. No. 09/623,277, Response dated Sep. 8, 2003.
U.S. Appl. No. 09/623,277, Non-Final Rejection dated Feb. 13, 2003.
U.S. Appl. No. 11/506,060, filed Aug. 16, 2006.
U.S. Appl. No. 11/506,060, Non-Final Rejection dated Oct. 19, 2010.
U.S. Appl. No. 11/506,060, Response to Final Rejection and RCE dated Mar. 3, 2010.
U.S. Appl. No. 11/506,060, Final Rejection dated Nov. 18, 2009.
U.S. Appl. No. 11/506,060, Response to Non-Final Rejection dated Aug. 13, 2009.
U.S. Appl. No. 11/506,060, Non-Final Rejection dated Mar. 11, 2009.
U.S. Appl. No. 10/482,074, filed Dec. 24, 2003, (Abandoned).
U.S. Appl. No. 13/165,553, filed Jun. 21, 2011.
U.S. Appl. No. 09/423,770, filed Nov. 12, 1999, (Abandoned).
U.S. Appl. No. 10/333,030, filed Jun. 6, 2003, (Abandoned).
U.S. Appl. No. 09/623,277, filed Sep. 1, 2000, (Abandoned).
U.S. Appl. No. 10/149,685, filed Jun. 13, 2002, (Abandoned).
U.S. Appl. No. 09/359,836, filed Jul. 23, 1999, (Abandoned).
U.S. Appl. No. 10/491,460, filed Apr. 1, 2004, (Abandoned).
U.S. Appl. No. 10/482,074, Jun. 18, 2008, Notice of Abandonment.
U.S. Appl. No. 10/482,074, Nov. 14, 2007, Non-Final Office Action.
U.S. Appl. No. 10/965,040, Aug. 10, 2011, Advisory Action.
U.S. Appl. No. 10/965,040, Aug. 2, 2011, Response to Final Office Action.
U.S. Appl. No. 10/965,040, May 13, 2011, Final Office Action.
U.S. Appl. No. 10/965,040, Feb. 25, 2011, Response to Non-Final Office Action.
U.S. Appl. No. 10/965,040, Oct. 29, 2010, Non-Final Office Action.
U.S. Appl. No. 11/448,114, Jul. 8, 2011, Non-Final Office Action.
U.S. Appl. No. 11/448,114, Apr. 27, 2011, Response to Non-Final Office Action.
U.S. Appl. No. 11/448,114, Oct. 28, 2010, Non-Final Office Action.
U.S. Appl. No. 11/448,114, Apr. 1, 2010, Amendment and Request for Continued Examination (RCE).
U.S. Appl. No. 11/506,060, filed Aug. 16, 2006, (Abandoned).
U.S. Appl. No. 11/448,114, Nov. 25, 2009, Final Office Action.
U.S. Appl. No. 11/448,114, Oct. 19, 2009, Response to Non-Compliant Response.
U.S. Appl. No. 11/448,114, Oct. 6, 2009, Notice of Non-Compliant Response.
U.S. Appl. No. 11/448,114, Aug. 12, 2009, Response to Non-Final Office Action.
U.S. Appl. No. 11/448,114, Mar. 16, 2009, Non-Final Office Action.
U.S. Appl. No. 09/423,770, Feb. 20, 2004, Notice of Abandonment.
U.S. Appl. No. 10/333,030, Jun. 25, 2000, Notice of Abandonment.
U.S. Appl. No. 09/623,277, Mar. 23, 2006, Notice of Abandonment.
U.S. Appl. No. 09/607,974, Jul. 9, 2004, Notice of Allowance.
U.S. Appl. No. 09/607,974, Apr. 26, 2004, Response to Non-Final Office Action.
U.S. Appl. No. 09/607,974, Dec. 11, 2003, Non-Final Office Action.
U.S. Appl. No. 09/607,974, Nov. 10, 2003, Request for Continued Examination (RCE).
U.S. Appl. No. 09/607,974, Sep. 3, 2003, Advisory Action.
U.S. Appl. No. 09/607,974, Jul. 30, 2003, Response to Final Office Action.
U.S. Appl. No. 09/607,974, May 9, 2003, Final Office Action.
U.S. Appl. No. 09/607,974, Apr. 4, 2003, Response to Notice of Informality or Non-Responsive Amendment.
U.S. Appl. No. 09/607,974, Feb. 24, 2003, Notice of Informal or Non-Responsive Amendment.
U.S. Appl. No. 09/607,974, Jan. 8, 2003, Response to Non-Final Office Action.
U.S. Appl. No. 09/607,974, Jul. 1, 2002, Non-Final Office Action.
U.S. Appl. No. 09/530,308, Apr. 20, 2006, Notice of Allowance.
U.S. Appl. No. 09/530,308, Jan. 23, 2006, Response to Non-Final Office Action.
U.S. Appl. No. 09/530,308, Oct. 20, 2005, Non-Final Office Action.
U.S. Appl. No. 09/530,308, Jul. 11, 2005, Filed Appeal Brief.
U.S. Appl. No. 09/530,308, May 12, 2005, Filed Notice of Appeal.
U.S. Appl. No. 09/530,308, Feb. 9, 2005, Final Office Action.
U.S. Appl. No. 09/530,308, Sep. 27, 2004, Response to Non-Final Office Action.
U.S. Appl. No. 09/530,308, Mar. 24, 2004, Non-Final Office Action.
U.S. Appl. No. 09/530,308, Jan. 12, 2004, Response to Non-Final Office Action.
U.S. Appl. No. 09/530,308, Oct. 2, 2003, Non-Final Office Action.

U.S. Appl. No. 09/530,308, Jul. 14, 2003, Response to Non-Final Office Action.
U.S. Appl. No. 09/530,308, Nov. 20, 2002, Non-Final Office Action.
U.S. Appl. No. 10/220,776, Aug. 23, 2004, Notice of Allowance.
U.S. Appl. No. 10/149,685, Feb. 7, 2008, Notice of Abandonment.
U.S. Appl. No. 10/149,685, Jul. 31, 2007, Non-Final Office Action.
U.S. Appl. No. 10/149,685, May 7, 2007, Response to Non-Final Office Action.
U.S. Appl. No. 10/149,685, Feb. 6, 2007, Non-Final Office Action.
U.S. Appl. No. 09/889,859, Mar. 22, 2004, Notice of Allowance.
U.S. Appl. No. 09/889,859, Jan. 12, 2004, Response to Non-Final Office Action.
U.S. Appl. No. 09/889,859, Sep. 10, 2003, Non-Final Office Action.
U.S. Appl. No. 09/359,836, Mar. 17, 2008, Notice of Abandonment.
U.S. Appl. No. 09/359,836, Aug. 10, 2007, Final Office Action.
U.S. Appl. No. 09/359,836, May 11, 2007, Response to Non-Final Office Action.
U.S. Appl. No. 09/359,836, Dec. 15, 2006, Non-Final Office Action.
U.S. Appl. No. 09/359,836, Sep. 21, 2006, Amendment and Request for Continued Examination (RCE).
U.S. Appl. No. 09/359,836, May 18, 2004, Final Office Action.
U.S. Appl. No. 09/359,836, Mar. 5, 2004, Response to Non-Final Office Action.
U.S. Appl. No. 09/359,836, Aug. 29, 2003, Non-Final Office Action.
U.S. Appl. No. 09/830,899, Nov. 4, 2009, Notice of Allowance.
U.S. Appl. No. 09/830,899, Oct. 1, 2009, Request for Continued Examination (RCE).
U.S. Appl. No. 09/830,899, Sep. 4, 2009, Notice of Allowance.
U.S. Appl. No. 09/830,899, Jun. 29, 2009, Response to Non-Final Office Action.
U.S. Appl. No. 09/830,899, Feb. 2, 2009, Non-Final Office Action.
U.S. Appl. No. 09/830,899, Dec. 22, 2008, Response to Non-Final Office Action.
U.S. Appl. No. 09/830,899, Oct. 9, 2008, Non-Final Office Action.
U.S. Appl. No. 09/830,899, Jul. 15, 2008, Amendment and Request for Continued Examination.
U.S. Appl. No. 09/830,899, May 16, 2007, Filed Reply Brief.
U.S. Appl. No. 09/830,899, Apr. 5, 2007, Examiner's Answer to Appeal Brief.
U.S. Appl. No. 09/830,899, Dec. 18, 2006, Filed Appeal Brief.
U.S. Appl. No. 09/830,899, Nov. 3, 2006, Filed Notice of Appeal.
U.S. Appl. No. 09/830,899, Jul. 3, 2006, Final Office Action and Examiner Interview Summary.
U.S. Appl. No. 09/830,899, Apr. 13, 2006, Non-Final Office Action.
U.S. Appl. No. 09/830,899, Mar. 3, 2006, Filed Appeal Brief.
U.S. Appl. No. 09/830,899, Feb. 15, 2006, Notice of Defective Appeal Brief.
U.S. Appl. No. 09/830,899, Dec. 19, 2005, Filed Appeal Brief.
U.S. Appl. No. 09/830,899, Nov. 9, 2005, Pre-Appeal Brief Conference Decision.
U.S. Appl. No. 09/830,899, Oct. 17, 2005, Amendment, Notice of Appeal and Pre-Appeal Brief Request.
U.S. Appl. No. 09/830,899, Jul. 5, 2005, Final Office Action.
U.S. Appl. No. 09/830,899, Dec. 27, 2004, Response to Notice of Non-Compliant.
U.S. Appl. No. 09/830,899, Dec. 7, 2004, Notice of Non-Compliant.
U.S. Appl. No. 09/830,899, Jul. 6, 2004, Amendment and Request for Continued Examination (RCE).
U.S. Appl. No. 09/830,899, Mar. 12, 2004, Final Office Action.
U.S. Appl. No. 09/830,899, Dec. 11, 2003, Response to Non-Final Office Action.
U.S. Appl. No. 09/830,899, Aug. 13, 2003, Non-Final Office Action.
U.S. Appl. No. 10/491,460, Jul. 11, 2006, Notice of Abandonment.
U.S. Appl. No. 10/728,345, Jun. 15, 2010, Notice of Allowance.
U.S. Appl. No. 10/728,345, Mar. 10, 2010, Response to Non-Final Office Action.
U.S. Appl. No. 10/728,345, Dec. 24, 2009, Non-Final Office Action.
U.S. Appl. No. 10/728,345, Oct. 5, 2009, Amendment and Request for Continued Examination (RCE).
U.S. Appl. No. 10/728,345, Jul. 9, 2009, Final Office Action.
U.S. Appl. No. 10/728,345, Apr. 9, 2009, Response to Non-Final Office Action.
U.S. Appl. No. 10/728,345, Dec. 10, 2008, Non-Final Office Action.
U.S. Appl. No. 10/728,345, Sep. 30, 2008, Response to Non-Final Office Action.
U.S. Appl. No. 10/728,345, Jun. 30, 2008, Non-Final Office Action.
U.S. Appl. No. 10/494,739, Oct. 10, 2007, Notice of Allowance.
U.S. Appl. No. 09/831,215, Sep. 6, 2006, Notice of Allowance.
U.S. Appl. No. 09/235,862, Oct. 25, 2002, Notice of Allowance.
U.S. Appl. No. 09/235,862, Oct. 21, 2002, Supplemental Response to Final Office Action.
U.S. Appl. No. 09/235,862, Oct. 10, 2002, Advisory Action.
U.S. Appl. No. 09/235,862, Sep. 30, 2002, Response to Final Office Action.
U.S. Appl. No. 09/235,862, Apr. 22, 2002, Final Office Action.
U.S. Appl. No. 09/235,862, Mar. 12, 2002, Response to Non-Final Office Action.
U.S. Appl. No. 09/235,862, Nov. 7, 2001, Non-Final Office Action.
U.S. Appl. No. 09/831,218, Mar. 1, 2006, Notice of Allowance.
U.S. Appl. No. 09/831,218, Feb. 10, 2006, Response to Final Office Action.
U.S. Appl. No. 09/831,218, Dec. 29, 2005, Final Office Action.
U.S. Appl. No. 09/831,218, Nov. 28, 2005, Response to Non-Final Office Action.
U.S. Appl. No. 09/831,218, Aug. 24, 2005, Non-Final Office Action.
U.S. Appl. No. 11/506,060, May 10, 2011, Final Office Action.
U.S. Appl. No. 11/506,060, Apr. 12, 2011, Response to Non-Final Office Action.
Sun, et al., "Architectures for MPEG Compressed Bitstream Scaling." Transactions on Circuits and Systems for Video Technology, vol. 6(2), Apr. 1996.
MPEG-7 Requirements; Oct. 1998.
MPEG-7 Context and Objectives; Oct. 1998.
MPEG-7 Proposal Package Description; Oct. 1998.
Oomoto E et al: "OVID: design and implementation of a video-object database system" IEEE Transactions on Knowledge and Data Engineering, IEEE, Inc. New York, US, vol. 5, No. 4, Aug. 1993, pp. 629-643, XP002134326 ISSN: 1041-4347.
Chung-Sheng Li et al: "Multimedia content descriptioin in the InfoPyramid" Acoustics, Speech and Signal Processing, Porceedings of the 1998 IEEE International Conference on Seattle, WA, USA May 12-15, 1998, New York, NY US, IEEE, US, pp. 3789-3792, XP010279595 ISBN: 0-7803-4428-6.
Sato et al., "Video OCR: Indexing digital news libraries by recognition of superimposed captions", Multimedia Systems, 7:385-394, 1999.
Trier et al.m "Feature extraction methods for character recognition—A survey", Pattern Recognition, vol. 29, pp. 641-662, 1996.
Tse et al., "Global Zoom/Pan estimation and compensation for video compression" Proceedings of ICASSP 1991, pp. 2725-2728.
Zhong et al., "Structure analysis of sports video using domain models", IEEE International Conference on Multimedia and Expo., Aug. 22-25, 2001, Tokyo, Japan.
Akutsu et al., "Video indexing using motion vectors", SPIE Visual communications and Image Processing 1992, vol. 1818, pp. 1522-1530.
Arman et al., "Image processing on compressed data for large video databases", Proceedings of ACM Multimedia '93, Jun. 1993, pp. 267-272.
Smoliar et al., "Content-Based video indexing and Retrieval", IEEE Mulitmedia, Summer 1994, pp. 62-72.
Sawhney et al., "Model-Based 2D & 3D Dominant Motion Estimation of Mosaicking and Video Representation" Proc. Fifth Int'l Conf. Computer Vision, Los Alamitos, CA, 1995, pp. 583-590.
Yeung et al., "Video Browsing using clustering and scene transitions on compressed sequences" IS & T/SPIE Symposium Proceedings, Feb. 1995, vol. 2417, pp. 399-413.
Meng et al., "Scene change detection in a MPEG Compressed video Sequence" IS & T/SPIE Symposium proceedings, vol. 2419, Feb. 1995.
Zhong et al., "Clustering methods for video browsing and annotation" sotrage and retrieval for Still Image and Video Databases IV, IS&T/SPIE's electronic Images: science & Tech. 96, vol. 2670 (1996).

Shahraray, B. "Scene Change Detecton and Content-Based sampling of video Sequences" SPIE conf. Digital Image Compression: Algorithms and Technologies 1995, vol. 2419.

Leung et al., "Picture Retrieval by Content description", Journal of Information Science; No. 18, pp. 111-119, 1992.

Meng et al., "Tools for Compressed-Domain Video Indexing and Editing", SPIE conference on storage and retrieval for Image and video Database, vol. 2670 (1996).

Li et al., "Modeling of moving objects in a video database", Proceeding of IEEE International Conference on Multimedia Computing and systems, pp. 336-343; Jun. 1997.

Li et al., " Modeling video temporal relationships in an object database management system", IS&T/SPIE international Symposium on Electronic Imaging: Multimedia Computing and Networking, pp. 80-91, Feb. 1997.

Oria et al., "Modeling images for content-based queried: the DISIMA Approach", Second international Conference on Visual Information Systems, pp. 339-346: Jun. 1997.

Lin et al., "A Robust image authentication Method surviving JPEG lossy compression"; SPIE 1998; pp. 28-30.

Lin et al., "A Robust image authentication Method distinguishin JPEG compression form malicious manipulation"; CU/CRT Technical Report 486-97-119, Dec. 1997; pp. 1-43.

Walton, Steven, "Image authentication for a slippery new age, knowing when images have been changed", Dr. Dobb's 1995.

Schneider et al., "A Robust content based digital sugnature for image authentication", Columbia University, Image and Advanced Television Laboratory, NY; 1996; pp. 227-230.

Li et al., "Issues and solutions for authenticating MPEG video", Columbia University, Department of Electrical Engineering, NY, Jan. 1999; pp. 54-65.

Kliot et al., "Invariant-Based shape retrieval in pictorial databases", Computer Vision and Image Understanding; Aug. 1998; 71(2): 182-197.

Schmid et al., "Local grayvalue invariants for image retrieval" IEEE Transaction on Pattern Analysis and Machine Intelligence; May 1997; 19(5): 530-535.v.

Cox et al., "Secure spread spectrum watermaking for multimedia", NEC Research Institute, Technical Report 95-10, Dec. 4, 1995; pp. 1 of 1 and 1-33.

International Search Report PCT/US09/40029, May 29, 2009.
International Search Report PCT/US99/26125, Apr. 3, 2000.
International Search Report PCT/US02/39247, Dec. 12, 2003.
International Search Report PCT/US00/34803, Oct. 29, 2001.
International Search Report PCT/US99/26126, May 10, 2000.
International Search Report PCT/US02/16599, Nov. 22, 2002.
International Search Report PCT/US02/31488, Feb. 4, 2003.
International Search Report PCT/US99/26127, Apr. 6, 2000.
International Search Report PCT/US10/023494, Apr. 1, 2000.
International Search Report PCT/US99/04776, May 14, 1999.
International Search Report PCT/US04/28722, Jun. 1, 2005.
International Search Report PCT/US06/007862, Mar. 29, 2007.
International Search Report PCT/US00/02488, May 25, 2000.
International Search Report PCT/US00/018231, Oct. 4, 2000.
International Search Report PCT/US09/069237, Mar. 1, 2010.
International Search Report PCT/US99/022790, Feb. 24, 1999.
International Search Report PCT/US99/22264, Feb. 11, 2000.
International Search Report PCT/US01/22485, May 11, 2003.
International Search Report PCT/US98/09124, Oct. 8, 1998.
International Search Report PCT/US03/12858, Nov. 25, 2003.

Geiger et al., "Dynamic Programming for Detecting, Tracking, and Matching Deformable Contours" IEEE Transactions on Pattern Analysis and Machine Intelligence, 17(3): 294-302, Mar. 1, 1995, XP000498121 *Abstract*.

M. Schaar, H. Radha, Adaptive motion-compensation fine- granular-scalability (AMC-FGS) for wireless video, IEEE Trans. on CSVT, vol. 12, No. 6, 360-371, 2002.

A. M. Tourapis. "Enhanced Predictive Zonal Search for Single and Multiple Frame Motion Estimation," Proceedings of Visual Communications and Image Processing 2002 (VCIP-2002), San Jose, CA, Jan. 2002, pp. 1069-1079.

H.-Y. Cheong, A. M. Tourapis, "Fast Motion Estimation within the H.264 codec," in proceedings of ICME-2003, Baltimore, MD, Jul. 6-9, 2003.

B. Girod, A. Aaron, S. Rane and D. Rebollo-Monedero, "Distributed video coding," *Proc. of the IEEE*, Special Issue on Video Coding and Delivery, 2005; pp. 1-12.

Z. He, Y. Liang, L. Chen, I. Ahmad, and D. Wu, "Power-Rate-Distortion Analysis for Wireless Video Communication under Energy Constraints," IEEE Transactions on Circuits and Systems for Video Technology, Special Issue on Integrated Multimedia Platforms, 2004.

K. Lengwehasatit and A. Ortega, " Rate Complexity Distortion Optimization for Quadtree-Based DCT Coding ",ICIP 2000, Vancouver,BC, Canada, Sep. 2000.

A. Ray and H. Radha, "Complexity-Distortion Analysis of H.264/JVT Decoder on Mobile Devices," Picture Coding Symposium (PCS), Dec. 2004.

H. Kim and Y. Altunbasak, "Low-complexity macroblock mode selection for the H.264/AVC encoders," IEEE Int. Conf. on Image Processing, Suntec City, Singapore, Oct. 2004.

X. Lu, E. Erkip, Y. Wang and D. Goodman, "Power efficient multimedia communication over wireless channels", IEEE Journal on Selected Areas on Communications, Special Issue on Recent Advances in Wireless Multimedia, vol. 21, No. 10, pp. 1738-1751, Dec. 2003.

Q. Zhang, W. Zhu, Zu Ji, and Y. Zhang, "A Power-Optimized Joint Source Channel Coding for Scalable Video Streaming over Wireless Channel", IEEE International Symposium on Circuits and Systems (ISCAS), May, 2001, Sydney, Australia.

Y. Eisenberg, C. E. Luna, T. N. Pappas, R. Berry, A.K. Katsaggelos, Joint source coding and transmission power management for energy efficient wireless video communications, CirSysVideo(12), No. 6, Jun. 2002, pp. 411-424.

National's PowerWise™ technology. http://www.national.com/appinfo/power/powerwise.html , Nov. 11, 2002.

X. Zhou, E. Li, and Y.-K. Chen, "Implementation of H.264 Decoder on General-Purpose Processors with Media Instructions", in Proc. of SPIE Visual Communications and Image Processing, Jan. 2003.

T.-C. Chen, Y.-C. Huang and L.-G. Chen, "Full Utilized and Resuable Architecture for Fractional Motion Estimation of H.264/AVC", ICASSP2004, Montreal, Canada, May 17-21, 2004.

T. Chiang and Y.-Q. Zhang, "A New Rate Control Scheme Using Quadratic Rate Distortion Model," IEEE Trans. Circuits Syst. Video Technol., vol. 7, pp. 246-250, Feb. 1997.

G. J. Sullivan and T. Wiegand, Rate-Distortion Optimization for Video Compression IEEE Signal Processing Magazine, vol. 15, No. 6, pp. 74-90, Nov. 1998.

A. M. Tourapis, F. Wu, S. Li, "Direct mode coding for bi-predictive pictures in the JVT standard", ISCAS2003, vol. 2, 700-703, Thailand, 2003.

V. Lappalainen, A. Hallapuro, and T.D. Hämäläinen, "Complexity of Optimized H.26L Video Decoder Implementation," IEEE Trans. Circuits Syst. Video Technol., vol. 13, pp. 717-725. Jul. 2003.

T. Wedi; H.G. Musmann, Motion- and aliasing-compensated prediction for hybrid video codingPage(s): IEEE Trans. Circuits Syst. Video Technol., vol. 13, pp. 577-586. Jul. 2003.

T. Wiegand, G. J. Sullivan, G. Bjontegaard, A. Luthra, "Overview of the H.264/AVC Video Coding Standard," IEEE Trans. Circuits Syst. Video Technol., vol. 13, pp. 560-576. Jul. 2003.

Wang, et al. "Dynamic rate scaling of coded digital video for IVOD applications." Transactions on Consumer Electronics, vol. 44(3), Aug. 1998, pp. 743-749.

Wee, et al., "Field-to-frame transcoding with spatial and temporal downsampling." Proceedings of the 1999 International Conference on Image Processing, vol. 4, Oct. 1999.

Wee, et al., "Secure scalable streaming enabling transcoding without decryption." Proceedings of the 2001 International Conference on Image Processing, vol. 1 of 3, Oct. 2001.

Wee, et al., "Secure scalable video streaming for wireless networks." Proceedings of the 2001 IEEE International Conference on Acoustics, Speech, and Signal Process, vol. 4 of 6, May 2001, pp. 2049-2052.

Sorial, et al., "Selective requantization for transcoding of MPEG compressed video." Proceedings of the 2000 IEEE International Conference on Multimrdia and Expo, vol. 1, 2000, pp. 217-220.
Kim, et al., "Description of Utility function based on optimum transcoding" ISO/IEC JTC1/SC/WG11 MPEG02/M8319, Apr. 2002.
Mukherjee, et al., "Structured scalable meta-formsats (SSM) for digital item adaptation" Proceedings of the SPIE, SPIE, Bellingham, VA, US, vol. 5018, Jan. 2003, pp. 148-167.
Friedman, G.L., "The Trustworthy Digital Camera: Restoring Credibility to the Photographic Image", IEEE Transactions on Consumer Electronics, 39(4):905-910; Nov. 1, 1993, XP000423080.
Lee et al., A Watermarking Sequence Using Parities of Error Control Coding for Image Authentication and Correction, IEEE Transactions on Consumer electronics, 46(2): 313-317, May 2000, XP00110026.
Tuong Dao, IEEE Proceedings, ISBN: 0-8186-8464-X; pp. 88-97, especially pp. 88-90.
Sajda et al., "In a blink of an eye and a switch of a transistor: Cortically-cuopled computer vision", Journal of Latex Class Files, Jan. 2007, 6(1): 1-14.
Wang et al., "Columbia TAG System—Transductive Annotation by Graph Version 1.0", Columbia University Advent Technical Report #225-2008-3, Oct. 15, 2008, entire document.
International Search Report—Application No. PCT/US2009/047492 (Aug. 27, 2009).
InfoTouch: An Explorative Multi-Touch Interface for Tagged Photo Collections. Linkoping University. Posted to YouTube website: May 31, 2007.
U.S. Appl. No. 11/448,114, Nov. 21, 2011 Final Office Action.
U.S. Appl. No. 10/965,040, Nov. 2, 2011 Notice of Appeal.
Gholamhosein et al., "Semantic Clustering and Querying on Heterogeneous Features for Visual Data", Proceedings of the ACM Multimedia 98, MM '98, Bristol, Sep. 12-16, 1998, *ACM International Multimedia Conference*, New York, NY: ACM, US, Vol. Conf. 6, pp. 3-12, XP000977482.
U.S. Appl. No. 11/615,120, Apr. 6, 2010, Issue Fee payment.
U.S. Appl. No. 11/615,120, Jan. 14, 2010, Notice of Allowance.
U.S. Appl. No. 11/615,120, Sep. 4, 2009, Response to Non-Final Office Action.
U.S. Appl. No. 11/615,120, May 4, 2009, Non-Final Office Action.
U.S. Appl. No. 12/574,716, Feb. 1, 2012, Issue Fee payment.
U.S. Appl. No. 12/574,716, Nov. 10, 2011, Notice of Allowance.
U.S. Appl. No. 10/965,040, Mar. 15, 2012, Notice of Allowance.
Amir et al., "IBM research TRECVID-2003 video retrieval system", *Proc. NIST Text Retrieval Conf. (TREC)*, 2003.
Anemueller et al., "Biologically motivated audio-visual cue integration for object categorization", *Proc. International Conference on Cognitive Systems*, 2008.
Barzelay et al., "Harmony in motion", *Proc. IEEE Conference Computer Vision and Pattern Recognition*, pp. 1-8, 2007.
Beal et al., "A graphical model for audiovisual object tracking", *IEEE Trans. Pattern Analysis and Machine Intelligence*, 25:828-836, 2003.
Chang et al., "Large-scale multimodal semantic concept detection for consumer video", *Proc. 9th ACM SIGMM International Workshop on Multimedia Information Retrieval*, 2007.
Chen et al., "Image categorization by learning and reasoning with regions", *Journal of Machine Learning Research*, 5:913-939, 2004.
Cristani et al., "Audio-visual event recognition in surveillance video sequences", *IEEE Trans. Multimedia*, 9:257-267, 2007.
Dalal et al., "Histograms of oriented gradients for human detection", *Proc. IEEE Conference Computer Vision and Pattern Recognition*, pp. 886-893, 2005.
Deng et al., "Unsupervised segmentation of color-texture regions in images and video", *IEEE Trans. Pattern Analysis and Machine Intelligence*, 23:800-810, 2001.
Friedman, et al., "Additive logistic regression: a statistical view of boosting", *Annals of Statistics*, 28:337-407, 2000.
Han et al. "Incremental density approximation and kernel-based bayesian filtering for object tracking", *Proc. IEEE Conference Computer Vision and Pattern Recognition*, pp. 638-644, 2004.
Hellman et al., "Probability of error, equivocation, and the chernoff bound", *IEEE Trans. on Information Theory*, 16(4):368-372, 1970.
Hershey et al., "Audio-vision: using audio-visual synchrony to locate sounds", *Proc. Advances in Neural Information Processing Systems*, 1999.
Iwano et al., "Audio-visual speech recognition using lip information extracted from side-face images", *EURASIP Journal on Audio, Speech, and Music Processing*, 2007.
Lowe "Distinctive image features from scale-invariant keypoints", *International Journal of Computer Vision*, 60:91-110, 2004.
Lucas, et al. "An iterative image registration technique with an application to stereo vision", *Proc. Imaging understanding workshop*, pp. 121-130, 1981.
Mallat et al., "Matching pursuits with time-frequency dictionaries", *IEEE Transaction on Signal Processing*, 41(2): 3397-3415, 1993.
Maron et al., "A framework for multiple-instance learning", *Proc. Advances in Neural Information Processing Systems*, pp. 570-576, 1998.
Naphade et al., "A factor graph fraemwork for semantic video indexing", *IEEE Trans on CSVT*, 12(1):40-52, 2002.
Ogle et al., "Fingerprinting to identify repeated sound events in long-duration personal audio recordings", *Proc. Int. Conf. Acoustics, Speech and Signal Processing*, pp. I-233-I-236, 2007.
Pack et al., "Experiments in constructing belief networks for image classification systems", *Proc. ICIP*, Vancouver, Canada, 2000.
Smith et al., "Multimedia semantic indexing using model vectors", *Proc. ICME*, 3:445-448, 2003.
Vasconcelos, eature selection by maximum marginal diversity: optimality and implications for visual recognition, *CVPR 1*:762-769, 2003.
Wang et al., "Learning Semantic Scene Models by Trajectory Analysis", *Proc. European Conference on Computer Vision*, pp. 110-123, 2006.
Wu, et al., "Multimodal information fusion for video concept detection," Proc. International Conference Image Processing, pp. 2391-2394, 2004.
Yang et al., "Region-based image annotation using asymmetrical support vector machine-based multiple-instance learning", Proc. IEEE Conference Computer Vision and Pattern Recognition, pp. 2057-2063, 2006.
Zhou et al., "Object tracking using sift features and mean shift," Computer Vision and Image Understanding, 113:345-352, 2009.
U.S. Appl. No. 11/448,114, Jul. 9, 2012, Amendment and Request for Examination (RCE).
U.S. Appl. No. 10/965,040, Jun. 7, 2012, Issue Fee payment.
U.S. Appl. No. 11/960,424, Jun. 29, 2012, Non-Final Office Action.
U.S. Appl. No. 11/846,088, Jun. 7, 2012, Non-Final Office Action.
U.S. Appl. No. 11/448,114, May 16, 2012, Notice of Appeal.

* cited by examiner

SYSTEM AND METHOD FOR DYNAMICALLY AND INTERACTIVELY SEARCHING MEDIA DATA

CROSS-REFERENCE TO RELATED APPLICATIONS

This application is a continuation in part of International Application No. PCT/US2009/047492, which is based on and claims priority to U.S. Provisional Application Ser. No. 61/132,358 filed on Jun. 17, 2008, both of which are incorporated herein by reference for all purposes.

BACKGROUND

As the amount of available digital media grows exponentially, an inability to efficiently search this media content becomes more apparent. In the past, research has focused on the extraction features at either the low level or the semantic level to aid in indexing and retrieval. However, known techniques for interactively searching (or querying) large media databases are unsatisfactory, and significant challenges in this area remain.

Exploration of a large collection of media data, such as video, images, or audio, is a non-trivial task. When a user approaches a new search task, formulating a query (i.e., search criterion) can be difficult. Most modern search systems provide the ability to search with textual input. These types of systems have been studied by the information retrieval community at large, but several problems become apparent when text-based systems are used to search media content.

First, the choice of correct query words can significantly affect the output of a video search system. Often a user may lack information about which words would best match the content he or she is looking for. Second, when using more advanced systems having automatically detected visual concepts derived from low-level image features and trained with a labeled set of data such as systems disclosed in both S. F. Chang et al., "Columbia University's Semantic Video Search Engine," ACM International Conference on Image and Video Retrieval, Amsterdam, Netherlands, July 2007, and J. R. Smith et al., "Multimedia semantic indexing using model vectors," Proceedings of IEEE International Conference on Multimedia and Expo, Baltimore, Md., July, 2003, non-expert users may lack knowledge about the concept vocabulary and accuracy of concept detectors.

Techniques have been proposed for fully automated approaches to combining descriptors of multiple modalities (text, low level features, and concepts). However, these solutions are not well-suited to be directly used in an interactive search system. In such systems, once search results are returned, the user may struggle to efficiently navigate through a large set of media content, and a typical interface showing a linear list of thumbnail images is often not sufficient. Such systems provide little information to help users understand why the given set of results were selected, how each returned image/video/media portion is related to the concepts chosen in the query, and how to efficiently adjust the strategies (e.g., fast-skimming vs. in-depth browsing) for exploring the result set. Such difficulties arise from the fundamental problem of disconnection between search result interfaces and the query criteria. Once the query is evaluated, the query criteria are typically discarded and the user is presented with a set of results without any information regarding the correlation of the search results to the concepts or search criteria that were used to identify those results.

Some visualization techniques have been proposed to assist users in fast browsing and exploration of result sets. However, these techniques do not provide for relating the search results to search criteria, and are unable to dynamically adjust the influence of each query criterion and thereby allow a user to interactively and dynamically modify searches. Thus, there is a need in the art for a technique for searching a media database which provides guided query formulation as well as dynamic and interactive query adaptation.

SUMMARY

The disclosed subject matter provides techniques for searching a database of media content wherein the user can dynamically and interactively navigate search results. In an exemplary method, one or more search anchors are received, and at least one of the search anchors is associated with anchor cells on a navigation map. At least one cell on the navigation map is populated with one or more documents based at least in part on the associated search anchors. At least one of the documents is output for at least one cell on the navigation map.

The disclosed subject matter also provides a system for searching a database of media content wherein the user can dynamically and interactively navigate search results. In some embodiments, the system includes an interface for receiving one or more search anchors, one or more processors for associating one or more of the search anchors with anchor cells on a navigation map and populating at least one cell on the navigation map with one or more documents, and a display for displaying at least one of the documents assigned to at least one cell on the navigation map.

The disclosed subject matter further provides for a computer-readable medium encoded with a computer program that includes computer executable instructions for dynamically and interactively searching a media database. In some embodiments, when executed, the computer program causes a processor to receive one or more search anchors, associate one or more of the search anchors with anchor cells, populate at least one cell on the navigation map with one or more documents, and output at least one of the documents assigned to at least one cell on a navigation map.

The accompanying drawings, which are incorporated and constitute part of this disclosure, illustrate the various exemplary embodiments of the present disclosed subject matter and serve to explain its principles.

DETAILED DESCRIPTION

The disclosed subject matter is generally directed to a system and method for dynamically and interactively searching a database of media content.

The database can be any collection of media data including, but not limited to, multimedia data, such as digital video with or without accompanying audio, audio data only, video data only, still images, or any other form of digital media data. The database can be a collection of files on a desktop computer, the files on a network, or a remote database communicably connected to a computing device, as through the Internet or some other distributed network. A person having ordinary skill in the art will recognize that any aggregation of media files, regardless of where and how the files are stored, can be searched using the disclosed subject matter.

In one embodiment, the database includes metadata associated with each media document. The stored metadata can include information relating to the author of the document (e.g., the singer for an audio clip, the photographer for an image), the geographic location (e.g., where a photograph was taken), a general description of the document, or any other information relating to the media data.

In one embodiment, the system and method can be implemented on a single computing device. The user can enter a text query using a keyboard and interact with an interface on the display screen using a mouse. The computing device can process information locally. The search can be limited to the files on a computer or any subsection thereof, such as the files located in a single folder or local disk drive.

Alternatively, in other embodiments, the system and method can be implemented in a network setting. In such an embodiment, all the files available on the network can be searched. Certain portions of the process can be performed by other processors or computing devices in the network. In a further exemplary embodiment, the system and method can be implemented using a client-server architecture model. The database can be stored at a remote location from the user's computing environment, such that the server can conduct the searches and transmit the results to the client for display. In such a system, the server can perform most or all of the computations, while the client can be used mostly for user input and display. A person having ordinary skill in the art will recognize that the system and method of the present disclosed subject matter can be implemented in other ways. For example, the system and method can be implemented on handheld devices such as smart phones or PDAs or other wireless computing devices.

Figure 1:
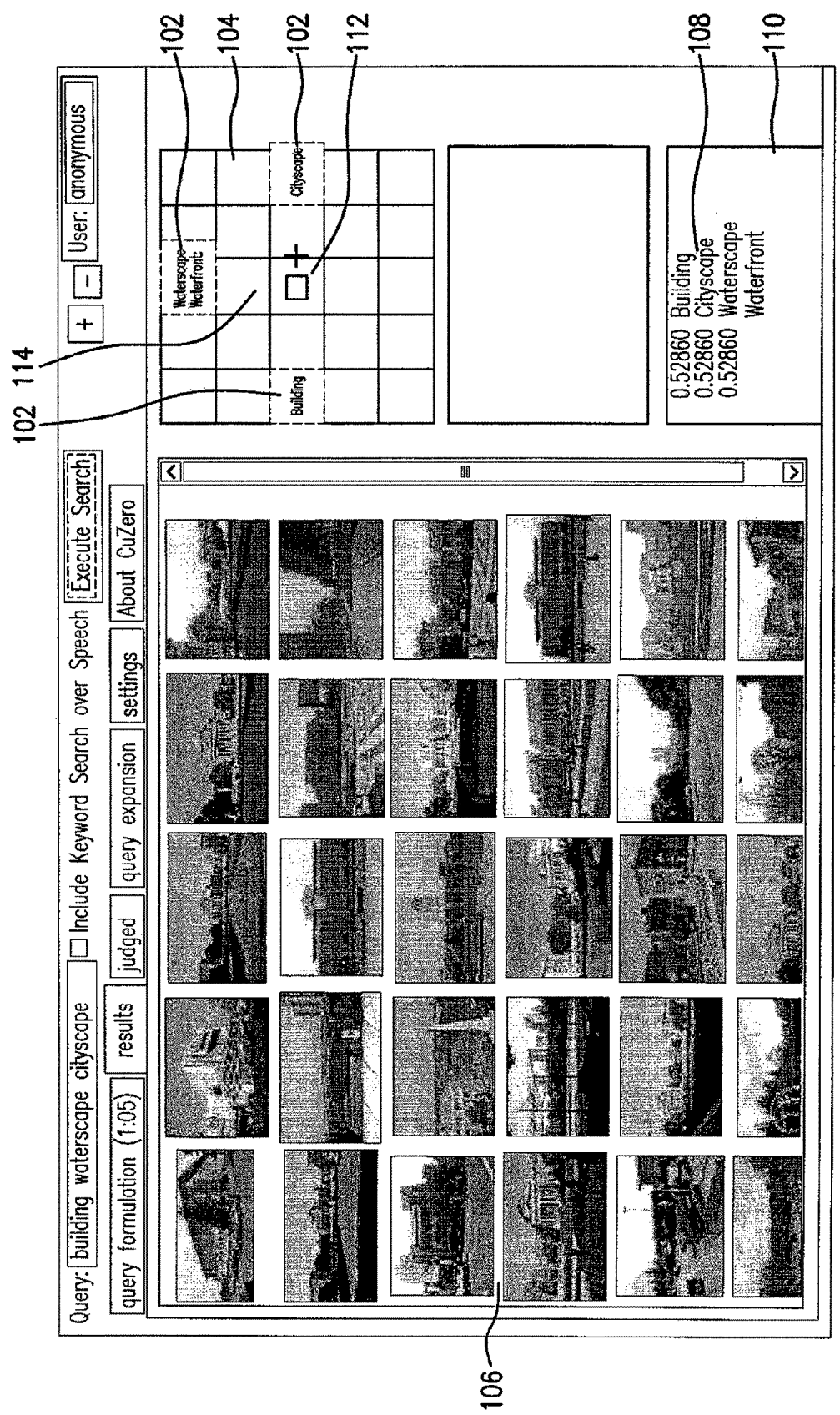
FIG. 1 illustrates an exemplary embodiment of the graphical user interface of the presently disclosed subject matter.

FIG. 1 illustrates one embodiment of the interface of the disclosed subject matter. In this embodiment, the search anchors 102 are positioned on a navigation map 104. The search anchors 102 are used to set the parameters for the search. The navigation map 104 allows the user to visually adjust the influence of each search anchor 102 on the results displayed in the result exploration panel 106. The navigation map 104 is comprised of cells. Each cell is associated with a set of search results and a concept relevance weight, which defines how much influence each search anchor has on the set of search results. The concept relevance weight 108 shown in the separate display window 110 and the search results displayed in the result exploration panel 106 are associated with the selected cell 112. The user can select a different cell to dynamically adjust the displayed results to his/her preference. More specifically, the user can select a different cell to display a new set of search results which are better suited to the user's preference. For example, if the user viewing the set of search results for the selected cell 112, as shown in FIG. 1, wants to view a set of results having more "Waterscape/ Waterfront" characteristics, the user can optimally select cell 114, and view the search results associated with that cell.

Figure 2:
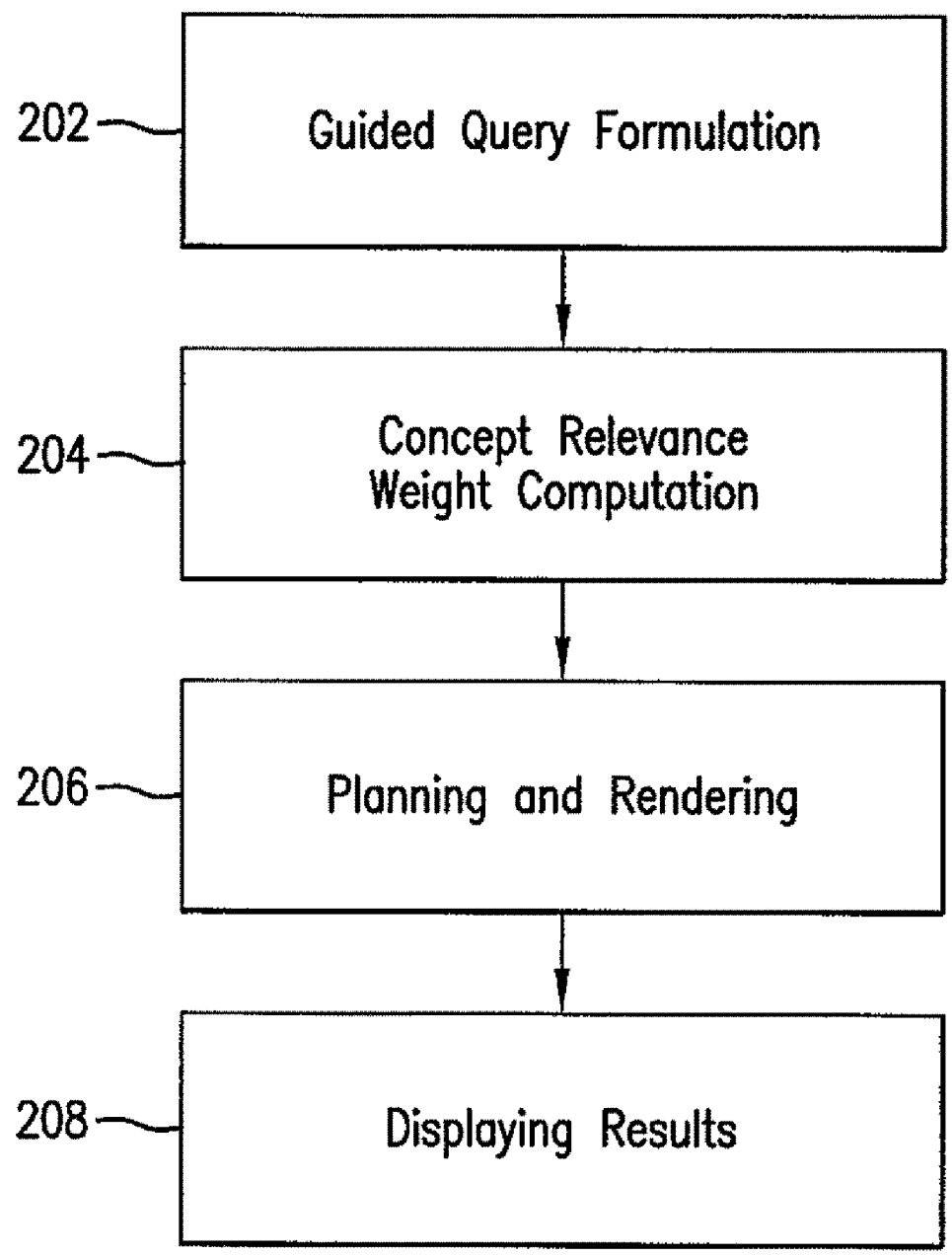
FIG. 2 is a chart which illustrates an exemplary embodiment of the disclosed subject matter.

FIG. 2 illustrates the method of one embodiment of the disclosed subject matter. This method for searching a collection of media data is broadly arranged into four stages: guided query formulation 202, concept relevance weight computation 204, planning and rendering 206, and displaying results 208.

The first stage 202 of the exemplary method is guided query formulation. Guided query formulation can be used to aid the user in configuring a search query to assist the user in identifying key words or concepts most likely to identify the desired media content. Guided query formulation can include suggesting search concepts in response to a text query, and can also allow a user to select search concepts from lists of topics or subtopics or to select a previously-used concept. In general, guided query formulation can include any method by which the system aids the user in selecting a search concept. In another exemplary embodiment of the disclosed subject matter, selected search concepts or the user's text query can be used as search anchors, as further described herein.

After the user selects one or more of the search concepts as search anchors, concept relevance weights can be computed for each cell on a navigation map in stage 204. The concept relevance weight for a given cell can be calculated based on the distance between the cell and the search anchors. In general, concept relevance weight computation can include any method for computing the relative impact of search anchors on a cell in the navigation map.

The planning and rendering stage 206 can follow the concept relevance weight computation stage. Planning and rendering can include any method by which a cell is populated with documents, such that selecting that cell triggers the display of at least a subset of those documents. A cell can be populated by assigning or associating documents with a cell. Note that the term "document" as used herein simply refers to a file or search result—the term therefore includes all types of files that can be searched in accordance with the principles of the disclosed subject matter, including all media/multimedia and/or other types of data or files. The planning and rendering stage can also include sending a certain subset of the documents to be cached locally, in the event that the document is not stored at the display location.

Finally, in 208 the results of the search can be displayed based on a selected cell. If a different cell is selected, a new set of documents can be displayed.

Figure 3:
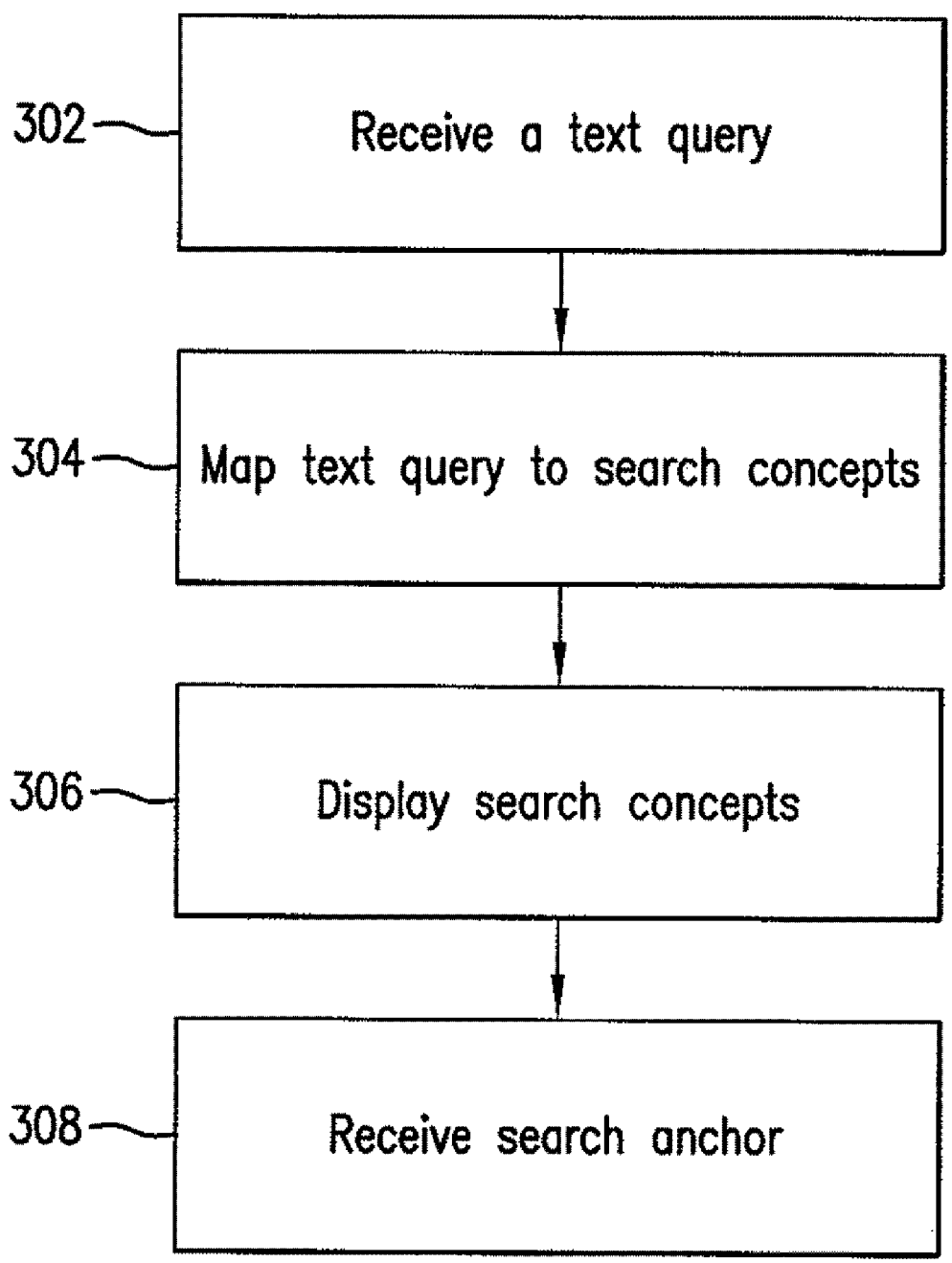
FIG. 3 is a chart which illustrates a guided query formulation stage of an exemplary embodiment of the disclosed subject matter.

Referring to FIG. 3, an exemplary embodiment of a system and method for guided query formulation is described. In the exemplary embodiment, a text query is received in 302. The text query can be received in response to a trigger, which can be a key press, or entry of the space bar, or any other trigger which can be used to initiate a next search to execute and then to modify the displayed search concepts. For example, by using the key press trigger method, the text query is received and the concept suggestion panel can be updated after every character (or, if the space bar trigger is used, every word, etc.). Alternatively, the trigger can be a timer set to measure user inactivity. The spacebar trigger can allow the display of information assistance through many suggestions to the user, which drives a guided and interactive query formulation instead of directly mapping the user's query into a specific set of automatically suggested search concepts. This allows for an automatic and instant suggestion of media concepts to be returned to the user. In some systems, such as a client-server system, the text query can be transmitted from the client to the server.

The text query can be mapped to search concepts in 304. This exemplary embodiment of the present disclosed subject matter can implement a concept-based query relevance model for determining which concepts will be displayed. Typically, known search systems return search results ranked by relevance to a user's query. Although known text search systems typically use a keyword ($k_q$) to compute relevance R to a document ($d_k$), this exemplary embodiment of the disclosed subject matter approximates media relevance $R_{vis}$ to a media document $d_k$ with a set of high-level concept-tags ($t_i$), or search concepts.

$$R(d_k;k_q) \approx R_{vis}(d_k;\{t_i\})$$

$$\{ti\}=\text{mapped\_concept\_tag}(k_q) \quad (1)$$

In some embodiments of the present invention, there can be a limited universe of allowable search concepts, such that only certain words or phrases can be identified as search anchors. In an exemplary embodiment the documents in a media database can be annotated using, for example, the LSCOM data set (available at www.ee.columbia.edu/dvmm/lscom) or Columbia-VIREO374, a subset of the LSCOM data set. In this exemplary embodiment, the search anchors can be required to be included in the data set. In another exemplary embodiment, any word or phrase can be used as a search anchor regardless of the data set stored. Each search anchor can embody a distinct, scored list of documents.

The text query can be mapped to search concepts using many different mapping methods. These mapping methods can include, but are not limited to, text completion with speech phrases, text to concept ontological mapping, text to concept mapping by LSCOM definition, co-occurring concepts, and dominant visual concepts from text results. Those having skill in the art will recognize that other concept suggestion techniques can be readily incorporated within the spirit and scope of the disclosed subject matter. The search concepts generated by such mapping methods can be transmitted, for example, from the server back to the client.

A plurality of search concepts based on the user-input text query are displayed in 306. The concepts can be displayed in a separate instant concept suggestion panel which dynamically updates during query formulation (i.e., 302, 304, and 306 can be repeated for each change in the text query). The plurality of search concepts which are displayed can be a single list of search concepts (i.e., generated by a single mapping method). However, typical automatic suggestion methods apply a direct mapping of keywords and evaluation of concept search without fully understanding the user's intent. Accordingly, this exemplary embodiment of the disclosed subject matter can present the results of many different mapping methods to bridge the semantic gap between media concepts and search concepts (i.e., keywords).

The search concepts recommended by the various mapping methods and displayed in 306 can be semantic concepts, media content, metadata, or any other appropriate information. Metadata can include the name of the author, time, and user-created tags, in addition to other information.

Additionally, the suggested search concepts can be displayed with differing appearance characteristics based on usefulness information. In one embodiment of the disclosed subject matter, a suggested concept can be shown in a larger font if it has high occurrence frequency (i.e., the search concepts which occur most frequently in the media data related to a particular concept or concept-tag) and high accuracy in automatic detection. Accuracy is determined by performance over a fixed data set. In addition to frequency and accuracy, any other usefulness data (i.e., data that measures how useful a search concept may be to the user based in part on the entered text query) can be utilized to alter the font size. Likewise, the usefulness data can be utilized to change other appearance characteristics of the suggested concept, such as color or the order in which the concepts are displayed. If the user cannot find a useful concept among the displayed concepts, the user can reformat the query by adding, deleting, or otherwise altering any portion of the text query.

If the user does identify a useful suggested concept, the user can select the concept to be used as a search anchor by selecting the concept in the instant concept suggestion panel. A search anchor can be received by any means that allows the search anchor to be identified, which can include the transmission of the search anchor itself or a reference to the search anchor. Regardless of how the search anchor is received by the system in accordance with the various exemplary embodiments of the disclosed subject matter, once a search anchor is received, an indication is provided to the system that a search anchor has been selected in 308. The search anchor can also be transmitted, for example, from the client to the server.

Figure 4:
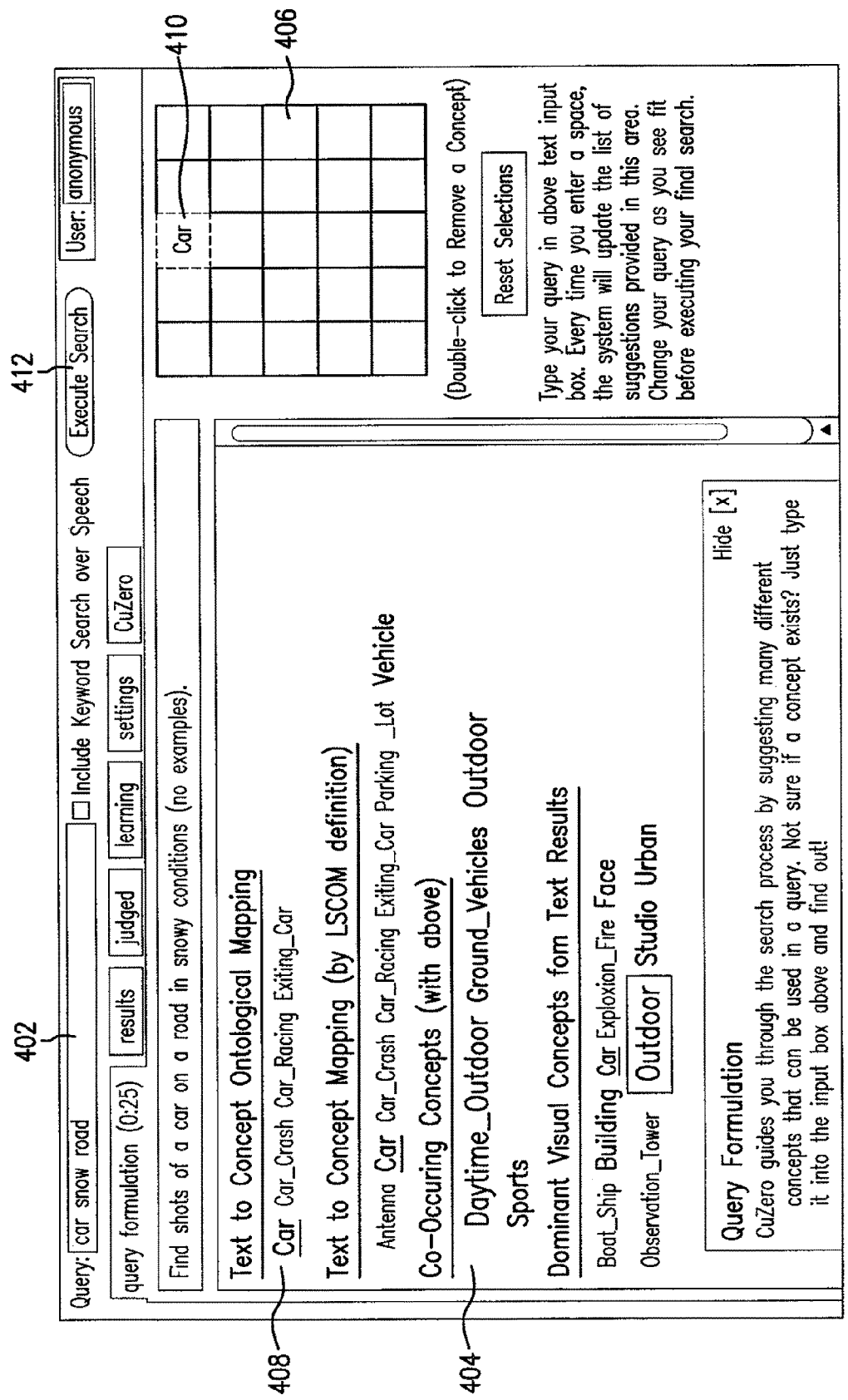
FIG. 4 illustrates a graphical user interface for the query formulation stage of an exemplary embodiment of the disclosed subject matter.

One exemplary graphical user interface for the query formulation stage 202 of the system and method of the disclosed subject matter is illustrated in FIG. 4. A text query can be entered into the text query input area 402. In response, the system can generate suggestions in the instant concept suggestion panel 404 based on the text query entered into the text query input area 402. Additionally, a navigation map 406 is shown. When a displayed concept is selected, the concept can be displayed as a search anchor on the navigation map 406. In FIG. 4, search anchor 410 corresponds to the selection of the selected search concept 408. The selected search concept 408 is underlined to indicate that it has already been selected, or in other embodiments can include different distinguishing display characteristics to convey this information to the user.

Figure 5:
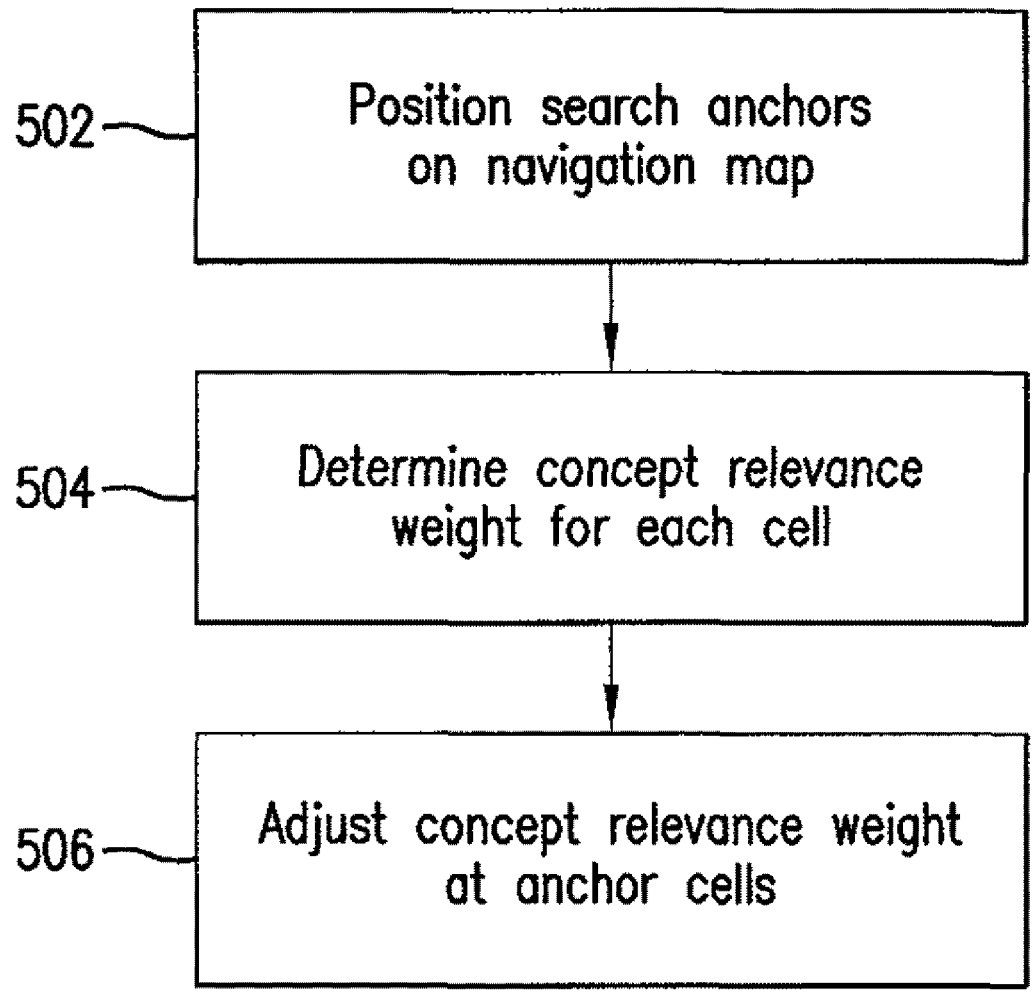
FIG. 5 is a chart which illustrates the concept relevance weight computation stage of an exemplary embodiment of the disclosed subject matter.

An exemplary embodiment of the relevance weight computation stage 204 from FIG. 2 is illustrated in FIG. 5. In the exemplary embodiment, search anchors can be positioned on a navigation map in 502.

Figure 6:
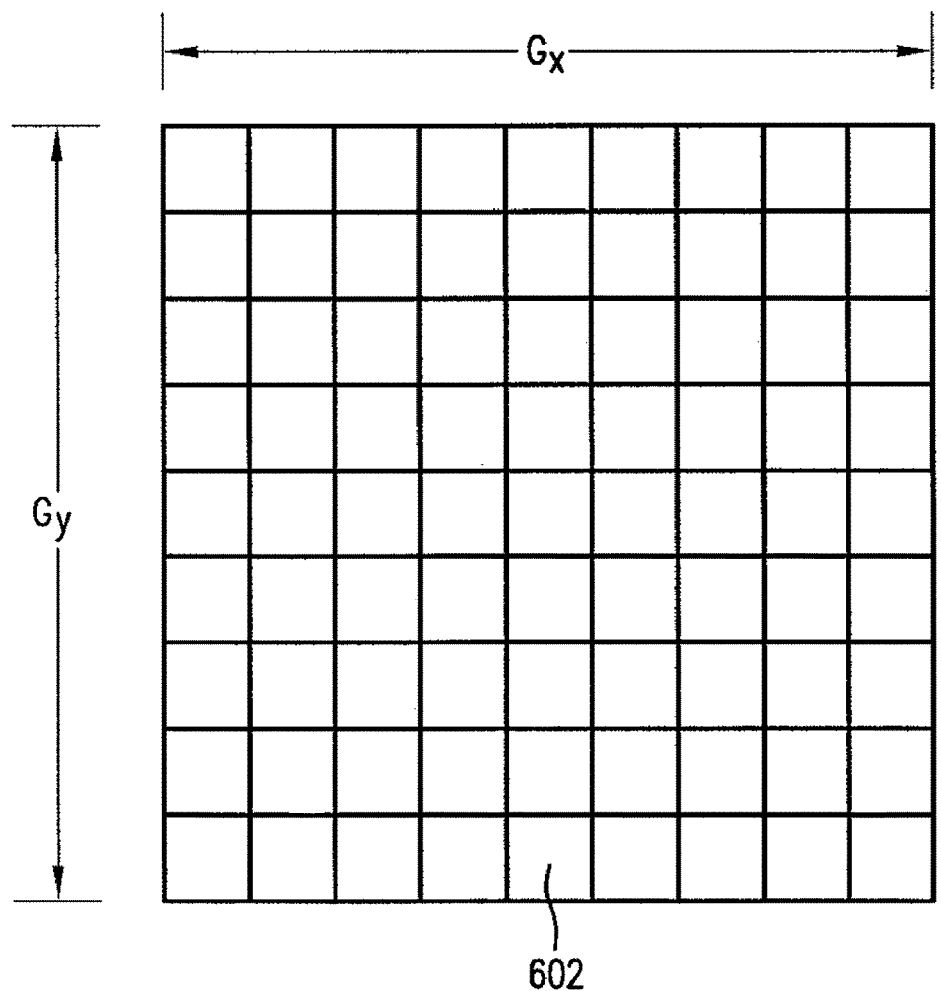
FIG. 6 illustrates a navigation map of an exemplary embodiment of the disclosed subject matter.

An exemplary embodiment of a navigation map 502 is illustrated in FIG. 5. The navigation map can be a grid having a width of $G_x$ cells and a height of $G_y$ cells, as in FIG. 6. The number of cells can be set to a default value, but other methods for selecting the size of the navigation map can be used. For example, the number of cells can be selected by the user or automatically configured based on the size of the database being searched. A nine-by-nine grid such as the navigation map 602 shown in FIG. 6 can be too large or unwieldy for a simple search performed on a mobile device or another device with a small screen capacity. It can be difficult for a user under those circumstances to accurately select any single cell on the navigation map, and thus a smaller matrix can be preferable. Conversely, for a more complex search of a large database, a nine-by-nine grid may not be sufficient. The user can choose to further separate the results in order to more easily navigate the results without having to delve deeply into each result list.

Importantly, the "navigation map" need not be limited to a grid layout. The navigation map can be any representation which allows the visualization of proximity as an indication of the relative influence of search anchors. As such, the navigation map can include a circle or even three-dimensional objects or spaces such as a cube or sphere, with anchors located at points or regions throughout. Further, the use of the term "cell" to refer to the areas which can be selected should not be construed to limit the understanding of the disclosed subject matter to require a navigation map divided into sections. A cell of the navigation map refers to any subsection of the navigation map. As such, the navigation map can be represented by a sphere in which every point or pixel constitutes a cell. Ultimately, any system that utilizes a representative space with anchors at various locations (or locations where anchors can be placed) in that representative space could be used to define the navigation map of an exemplary embodiment of the disclosed subject matter, and it is therefore not limited to any one embodiment.

Figure 7:
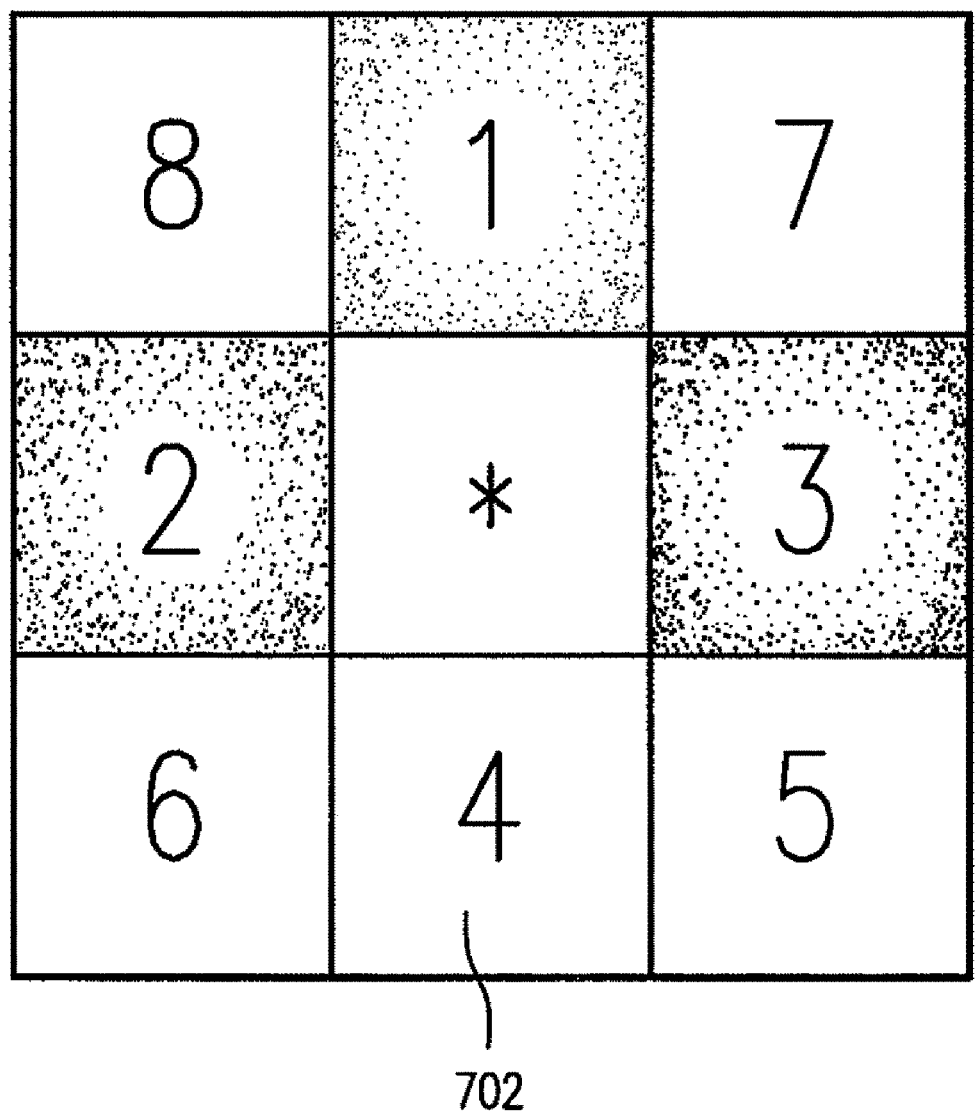
FIG. 7 illustrates a placement map demonstrating how search anchors are automatically positioned according to an exemplary embodiment of the disclosed subject matter.

Referring again to FIG. 5, a search anchor is positioned on the navigation map in 502. Additional search anchors can have already been positioned on the navigation map, such that every search anchor is associated with an anchor cell. In an exemplary embodiment of the disclosed subject matter, the search anchors can be initially positioned according to a pre-determined priority order. For example, as illustrated in FIG. 7, search anchors can be placed on the navigation map in the order indicated by the placement map 702 (i.e., the fifth search anchor chosen would be placed in the cell located at the lower right hand corner of the navigation map as indicated by the number 5). Alternatively, the search anchor can be positioned by the user by using a drag-and-drop technique or any other technique that would allow the user to manipulate the location of the search anchor on the map through the interface. Similarly, once the search anchor has been positioned on the navigation map, the user can have the option of re-positioning the search anchor to a different cell.

In the system and method of the disclosed subject matter, there is no limit to the number of search anchors that can be selected and placed on a navigation map. However, the addition of numerous simultaneous search anchors can decrease the intuitiveness of the navigation map by crowding the navigation map and making differences between the image results of cells in the navigation map less obvious, and can also increase the system requirements in terms of memory, processing power, and search time latency.

Referring again to FIG. 5, a concept relevance weight is determined for each cell in a navigation map in 504. The concept relevance weight describes the relationship between the search anchors and each cell in the navigation map. In one embodiment of the disclosed subject matter, the concept relevance weight is based on the distance between each cell and the one or more search anchors. While the concept relevance weight can be based on linear distance such as relative 2D distance, this can be easily adapted to non-linear distances. The concept relevance weight for a given cell can be calculated by calculating a concept relevance weight for each search anchor, then combining the concept relevance weights for each search anchor such that a concept relevance weight for each cell in a navigation map having n search anchors will have n components in its concept relevance weight.

Figure 8:
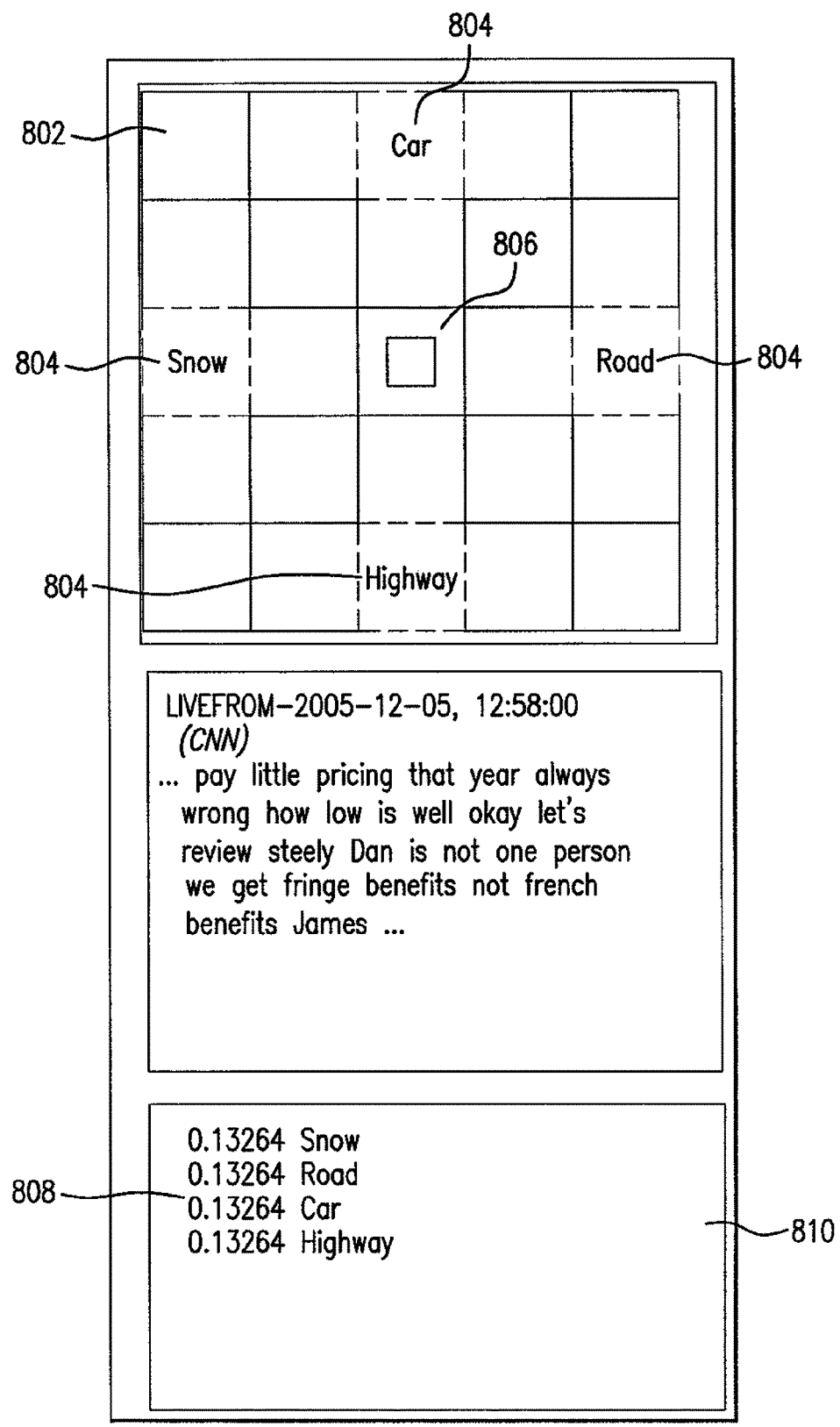
FIG. 8 illustrates a portion of the graphical user interface for an exemplary embodiment of the disclosed subject matter.

Referring to FIG. 8, a portion of an exemplary embodiment of a graphical user interface is illustrated. Although the information in the interface may not yet have been displayed at this point in the process, certain information related thereto can be instructive. A navigation map 802 has four search anchors 804. The concept relevance weight 808 for a selected cell 806, as indicated by the square, can be displayed in a separate window 810. In this exemplary embodiment, a concept relevance weight is calculated for each search anchor and combined to comprise the concept relevance weight 808, which has four components corresponding to the four search anchors 804 on the navigation map 802.

In an exemplary embodiment, a Gaussian weighing algorithm can be employed to determine the concept relevance weight for a cell. The first part of such an algorithm is to compute a Euclidean distance $d_{i,n}$ between a cell $c_i$ and each search anchor $a_n$ according to the cell's position $c_i^{x,y}$ and the search anchor's position $a_n^{x,y}$. Next, each cell is assigned a cell priority $p_i$ based on the Euclidean distance. (This priority can be used to determine the order in which the concept relevance weight is determined for each cell; it also can be used when the cells are populated). Then, a Gaussian weight $w_{i,n}$ for each cell i and concept n is computed on the basis of a Gaussian re-weighing factor $\sigma$. The tuning of the Gaussian re-weighing factor $$w_{i,n} = \frac{1}{\sigma\sqrt{2\pi}} \exp\left\{\frac{-(d_{i,n})^2}{2\sigma^2}\right\}, \quad (2)$$

provides high-precision control of how dramatically each concept anchor $a_n$ influences its neighboring cells $c_i$:

Finally, the cell weights are normalized by the maximum weight for each concept:

$$w_{i,n} = \frac{w_{i,n}}{\max(w_{i,n})} \quad (3)$$

Referring again to FIG. 5, the concept relevance weights of the anchors cells can be adjusted in 506. In this exemplary embodiment, the concept relevance weight for the anchored search anchor (i.e., the search anchor located at the anchor cell) is 1 at the anchor cell. In order to allow the user to explore a series of results based solely on a single search anchor, the relevance weights for all other search anchors can be set to zero. In another exemplary embodiment, such adjustment can be left out and the results at the anchor cell can be strongly but not entirely based on a single search anchor.

Figure 9:
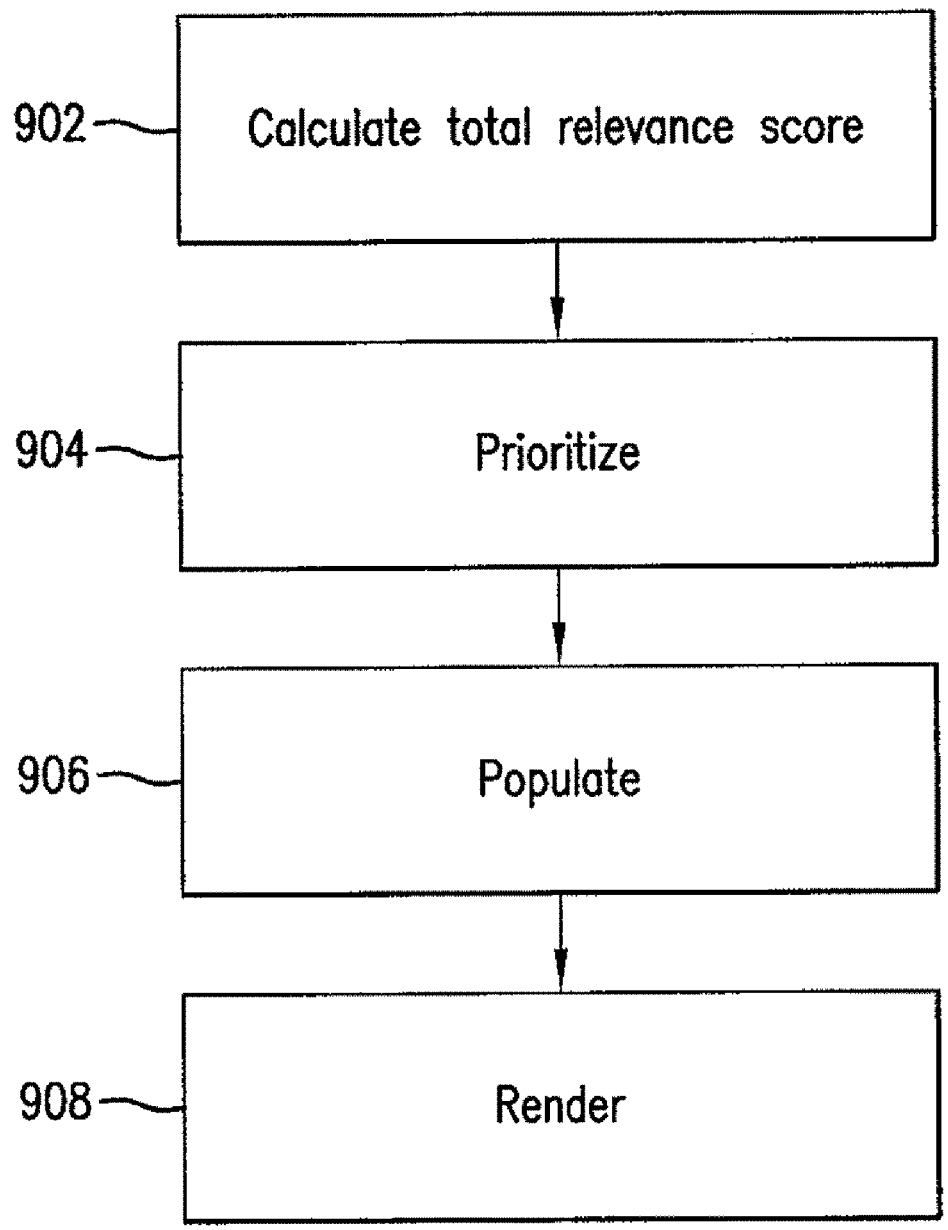
FIG. 9 is a chart illustrating the planning and rendering stage of an exemplary embodiment of the disclosed subject matter.

Referring to FIG. 9, an exemplary embodiment of the planning and rendering stage 206 of FIG. 2 is illustrated. In this exemplary embodiment, in 902 of FIG. 9 a total relevance score $R_{vis}(d_k;c_i)$ can be calculated for each document separately for each cell, such that a given document can be assigned m different total relevance scores in a navigation map having m cells. The total relevance score for a given document in a given cell can be based on the concept relevance weight for the cell and the document relevance score for a document. The document relevance score $R_{vis}(d_k; a_n)$ describes the relationship between a document $d_k$ and a search anchor $a_n$. The total relevance score describes the relationship between a cell $c_i$ and a document and can be used to plan which results can be displayed, and the order in which they may be displayed, for a given cell. The total relevance score can be computed by the equation:

$$R_{vis}(d_k; c_i) = \sum_{n=1}^{N} w_{i,n} R_{vis}(d_k; a_n) \quad (4)$$

where N is the total number of search anchors positioned on the navigation map.

In an exemplary embodiment, each cell can be populated with every document that has a non-zero document relevance score for any of the search anchors. The planned results for each cell can be a weighted combination of many concept result lists, as indicated by the equation above. In an exemplary embodiment, every cell can include the same results and the only difference is the order in which the results are displayed. In another exemplary embodiment, each cell can be populated with every document in the database. In other embodiments, each cell can be populated with some subsection of the documents having a non-zero document relevance score for any search anchor. For example, a cell could be populated only with the exclusive list of documents described below.

Figure 10:
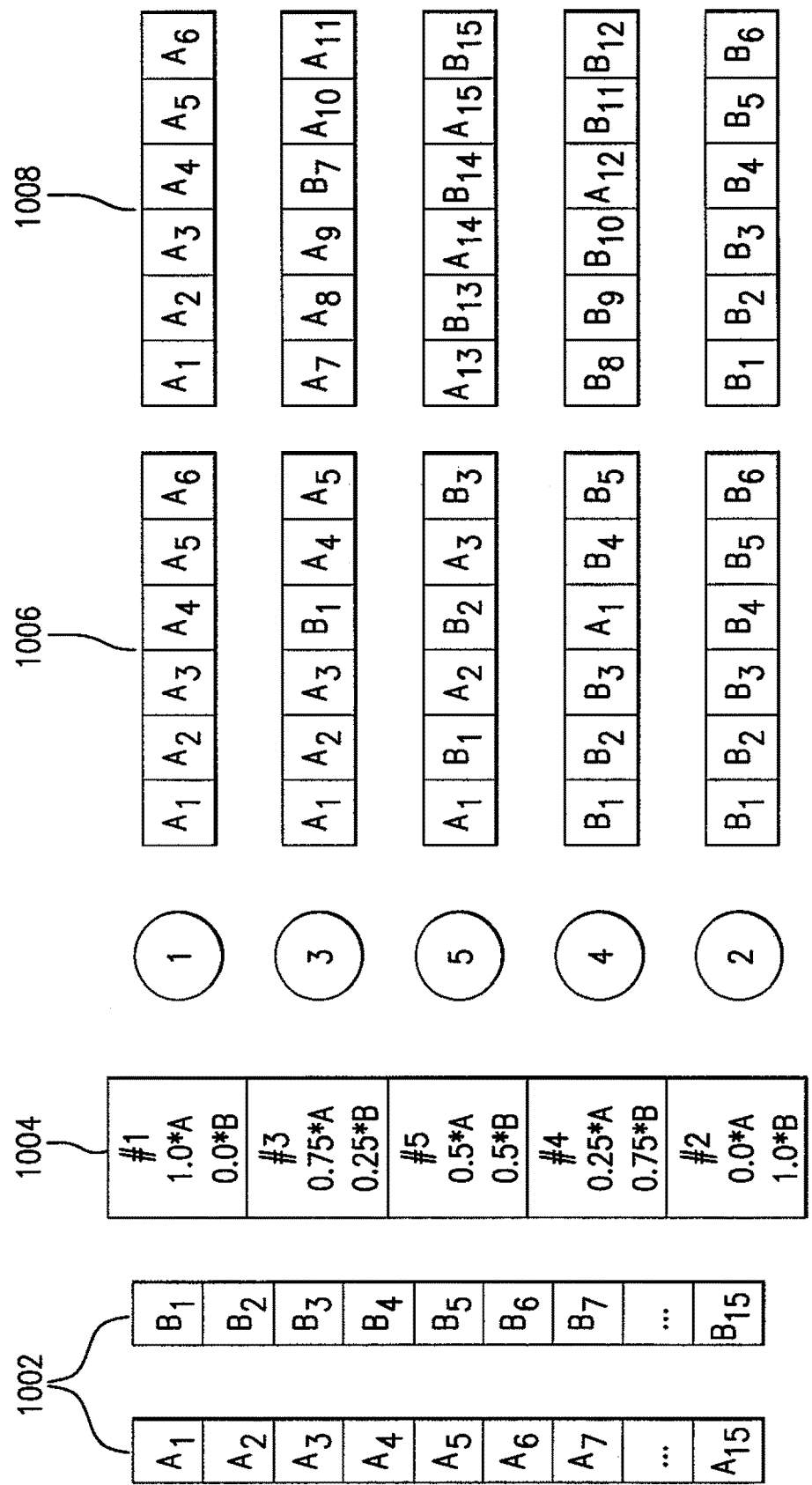
FIG. 10 illustrates the advantages of repeated result exposure tools in an exemplary embodiment of the disclosed subject matter.

In a traditional search system, the results would be displayed solely on the basis of a relevance score (between a keyword and a document). However, in connection with the disclosed subject matter, evaluating multiple queries with traditional weighted score fusion could produce many degenerate, overlapping result lists as illustrated in FIG. 10. The database 1002 to be searched in the example of FIG. 10 has 30 results (A1-A15 and B1-B15) that correspond to either search anchor A or search anchor B. The five cells of the navigation map 1004 have each been assigned a concept relevance weight. Using the traditional weighing methods and a first page consisting of six results, result lists 1006 are generated. Each of the result lists represents the results that would be displayed on a first page for one of the five cells. In these lists, eighteen of the thirty results are not shown until at least the second page and two results, A1 and B1, are displayed on the first page of results for four cells.

In an exemplary embodiment of the disclosed subject matter, a form of result planning can be employed to guarantee that the first page of results (those immediately visible to the user for each cell) are unique for every cell in the navigation map, thus facilitating more efficient searching. In the exemplary embodiment illustrated in connection with FIG. 10, this method is used to generate the result lists with a uniqueness guarantee as shown by 1008, which displays all thirty of the results on the first page of one of the five cells. This implementation can provide for a better survey of results than in previous methods, which displayed only twelve of the thirty results on the first page of results for any cell. This scheme for suppression of repeated results can improve the user experience in two ways: it can encourage deeper exploration of concept results and can create a more engaging browsing experience, because the user can instantly inspect a more diverse set of images. This guarantee scheme is only possible where the number of possible results is greater than the number of results on a first page multiplied by the number of cells in the navigation map.

Referring again to FIG. 9, avoidance of repeated results can be accomplished by prioritizing a pre-determined number of results for each cell in 904. In an exemplary embodiment, the pre-determined number is the number of results on a first page of results, but the number can be chosen by the user in other embodiments. In such an embodiment, a cell priority list is determined. This can be an actual list of the cells in order of priority, or it can refer to assigning a priority to each cell such that such a list could easily be constructed. The system can prioritize cells with the smallest distance to any search anchor. Numerical ties between cells equidistant from any search anchor can be broken by prioritizing concepts in the order that the user selected them. Alternatively, numerical ties can be broken by a ranking or order of the cells or search anchors determined by the user. Then, beginning with the cell having the highest priority and continuing in order of priority, a pre-determined number of results can be prioritized for each cell. This exclusive list of results is comprised of the pre-determined number of results with the highest total relevance score for that cell which have not been prioritized by any cell having a higher priority.

As illustrated in 906, one or more cells are populated with some number of documents, such as an ordered list of media (i.e., documents, or search results, are assigned to cells in the navigation map). The ordered list can be comprised of the exclusive list in order of total relevance score followed by all other results for the cell in order of total relevance score. Thus, the first pre-determined number of results could be unique for every cell to the extent such an arrangement is possible. In 908, a certain number of documents associated with each cell can be rendered. These results could be cached for instant availability of, for example, a first page of results when a cell is initially selected. Rendering 908 can be unnecessary when the system is confined to a single computer, but can be useful where the documents need to be transmitted, for example, from a database or server to a client.

In an exemplary embodiment of the disclosed subject matter, 902-908 of FIG. 9 can be done in order of priority. A priority score for each cell can be computed prior to or during the planning and rendering stage. In accordance with the disclosed subject matter, each cell can be planned and rendered in an order determined by this priority score. Note that this priority score can be used to form the cell priority list in 904 of FIG. 9. In another embodiment of the disclosed subject matter, if a user attempts to explore an unplanned or un-rendered cell, the selected cell can immediately be planned, if necessary, and then rendered, if necessary, regardless of the order of priority, at which point the system can return to planning and rendering the cells based on priority.

Figure 11:
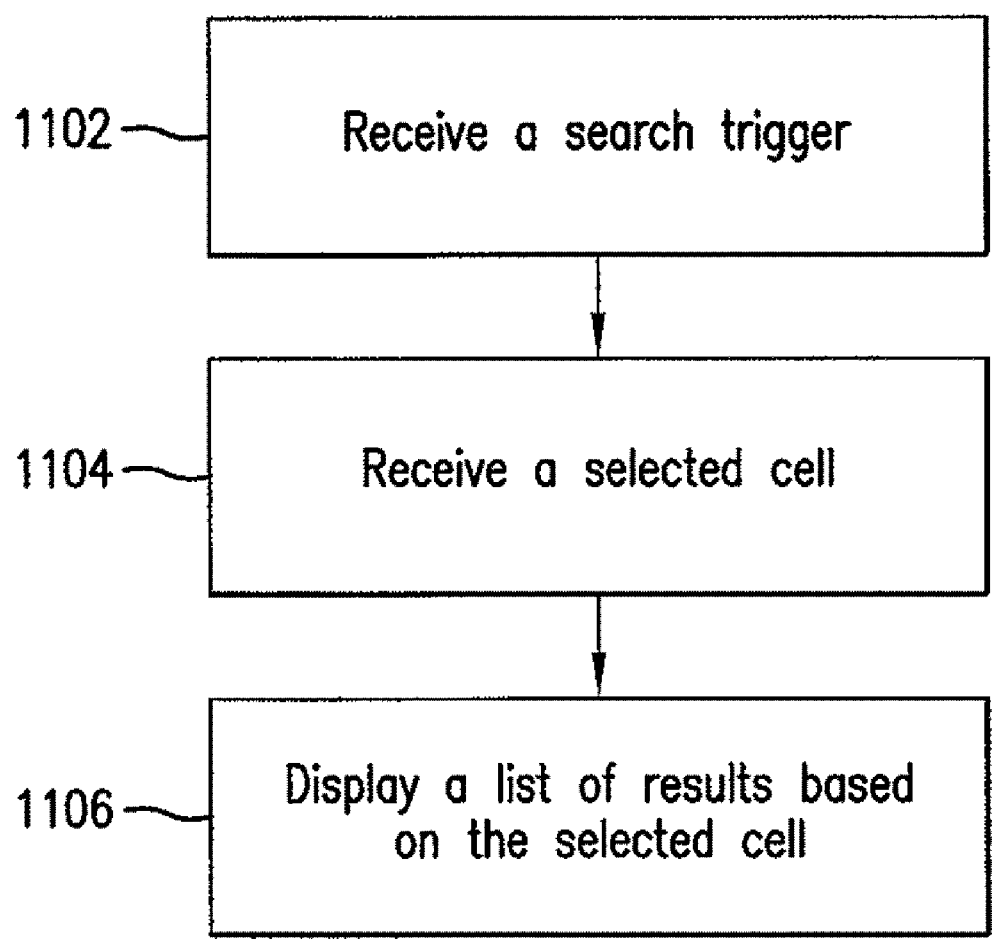
FIG. 11 is a chart illustrating an exemplary embodiment of the displaying results stage of the disclosed subject matter.

Referring to FIG. 11, an exemplary embodiment of the display stage 208 of FIG. 2 is illustrated. In 1102, a search trigger can be received. The search trigger controls when the documents or search results are to be displayed or updated to the user. This search trigger can include pressing a "search" button, but can additionally include a key-press such as the Enter key or the selection of a cell on the navigation map, or other action by the user indicating that the search should be initiated. For example, the search trigger can also be the receipt of a search anchor. Note also that the receipt of a search trigger can occur at almost any time during the process. If the planning and rendering stage occurs in the background while the user is formulating the query (such as between the selection of the final search anchor and the decision that no further search anchors will be selected), the search trigger will be received after the planning and rendering stage. However, the search trigger can be received at a different point in the process. For example, in the exemplary embodiment illustrated in FIG. 4, the search can begin only when the user has selected the Execute Search button 412. In such a system, the search trigger (selecting the Execute Search Button 412) can be received before the planning and rendering stage begins. The search trigger can be received earlier where the trigger is the receipt of a search anchor. The search trigger, or an indication that the search trigger has been received, can be transmitted, for example, from the client to the server.

At least by this point, the first navigation map can be made available to the user. In an exemplary embodiment, the navigation map can be made available (i.e., the user can select a cell in the navigation map) to the user during the query formulation stage, but the results are not displayed until the search trigger is selected in 1102. In another exemplary embodiment, the navigation map can be made available to the user only after the search trigger is received. In this embodiment, the selection of a cell by the user before the navigation map is made available will have no effect (i.e., the cell will not be designated as the selected cell and no graphical representation of the selection will be displayed). The navigation map as displayed can consist of the cells and the search anchors, without any additional information. In another exemplary embodiment, however, the navigation map can additionally include information such as a representation of the results after the search trigger is received. For example, the navigation map can visually indicate the density of results in each cell.

Referring again to FIG. 11, a selected cell is received in 1104. The cell can be received in response to user input. The cell can also be selected by default (i.e., upon receiving the search trigger the results of a certain cell (for example, the center cell) are automatically displayed).

The results of the search for the selected cell are displayed in 1106. In other embodiments, the results can be output in other ways. Other output methods can include transmitting a set of documents to another computing device. The displayed documents can consist of a subsection of the documents of the ordered list generated when the cells are populated in 906 of FIG. 9. This subsection refers to the ordered list as a whole or any subset of the documents in the ordered list. The results can be shown as listed in the ordered list and displayed in a separate real-time result exploration panel, or in any other manner in accordance with the objects of the disclosed subject matter.

Figure 12A:
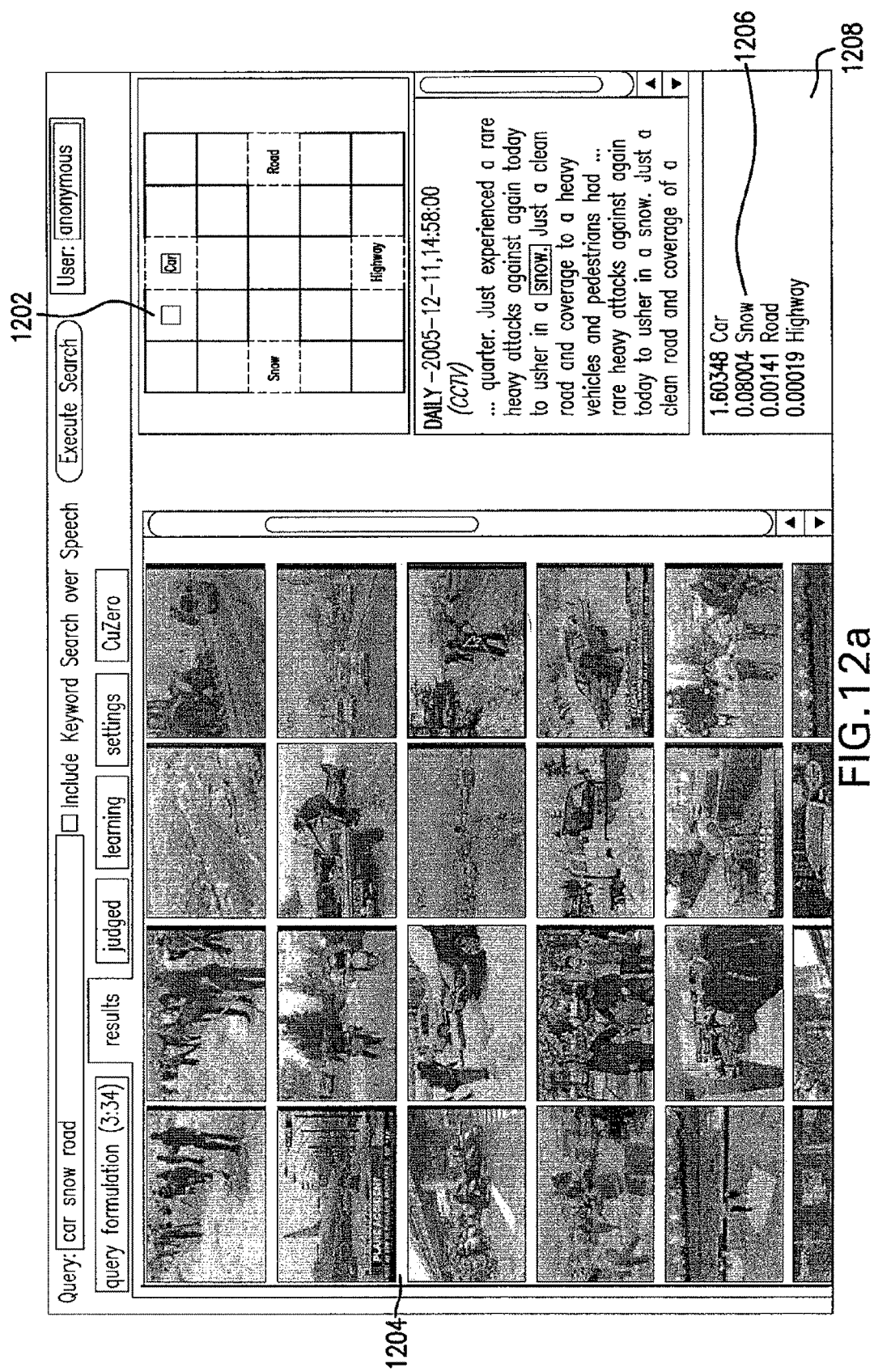
FIG. 12(a)-12 (b) illustrates the use of super-anchors in connection with an exemplary embodiment of the disclosed subject matter.
Figure 12B:
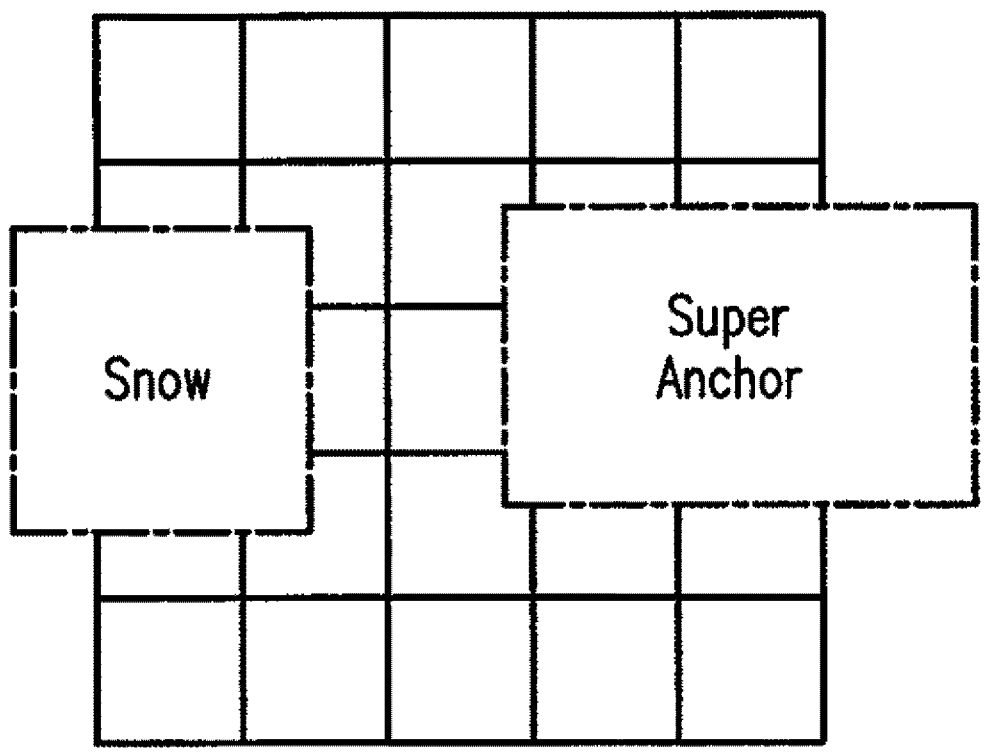

The user can then select any cell. Color coding can be used to indicate which cells have already been searched. In connection with an exemplary embodiment, for each selected cell, a list of results is displayed based at least in part on the distance between the cell and the search anchors. In some cases, the user can have invested a significant amount of time in formulating the query and browsing the results to identify a set of results. If an ideal location (or, more specifically, a cell that is influenced by each search anchor to an extent the user finds ideal for his/her purposes) is found, the user may not want to have to have to perform the entire search again in order to find the same location. In such circumstances, a user can save the ideal location, or a reference to the location, as a super-anchor. For example, in FIG. 12*a*, cell 1202 is selected. The concept relevance weight 1206 displayed in the separate window 1208 corresponds to the selected cell 1202. The user may find the results displayed in the result exploration panel 1204 to be well-suited for his/her purposes. The cell 1202 or, in one embodiment, the concept relevance weight 1206 which corresponds to the cell 1202, can be stored to memory. The user can access and apply the stored super-anchor at a later time or to another search, as in FIG. 12*b*, or set the super-anchor as an automated alert, such that the user receives an email or other communication when new responsive search results are added to the data set. Additionally, the super-anchor can be used as a search anchor in a later search. Similarly, this exemplary embodiment of the disclosed subject matter could be modified to allow users to load or save entire navigation maps across many searches, thereby creating templates of navigation maps that can be quickly reapplied by any user or to any collection of data.

After viewing a set of results, the user can find that none of the results are satisfactory, and the user can edit the search criteria. When the user selects a search concept, it can be added to the navigation map as a search anchor and a request can be initiated for new concept relevance weights and a new result list. Similarly, new concept relevance weights and result lists can be applied if concepts are removed or rearranged on the navigation map. To execute these changes, an exemplary embodiment of the disclosed subject matter can monitor changes to the navigation map and compute new concept relevance weights for each cell (stage 204 of FIG. 2), but can be configured to perform the planning and rendering stage (stage 206 of FIG. 2) for an individual cell only if the cumulative concept relevance weight change exceeds a predetermined stability threshold, as these recalculations can consume significant system resources. However, in another embodiment, a system of the disclosed subject matter can be configured to repopulate all cells for the entire navigation map. This cumulative concept relevance weight change can be calculated by aggregating the changes for the concept relevance weight of the cell for each concept. The threshold can be heuristically chosen to ensure that the user's modification did not significantly modify the previously planned and rendered navigation map layout. However, the threshold can also be chosen according to a wide range of additional information including available memory and other system resources, and the accuracy required by the search.

The cumulative concept relevance weight change can also be calculated when a search anchor is replaced through the use of in-place anchor editing. The in-place anchor editing process allows fast lookup of related search concepts by, for example, right clicking on a search anchor. It also allows the user to swap in a back-up search anchor. The related search concepts that can be swapped in can include other concepts suggested in the query formulation stage, metadata relationships such as capture time, author/channel, and geographic location, or any other variables that would be helpful to the user in connection with the intended search.

The system and method of the disclosed subject matter can be implemented with a continuous scrolling interface that dynamically renders subsets of results as the user inspects and depletes the current set of documents that have already been cached. In one embodiment, only a first page of documents can be readily available for any given cell. The continuous scrolling technique can enhance efficiency by avoiding the time lost when the user attempts to access additional pages of documents (in this example, by clicking "next") and waits for further documents to be displayed. This dynamic loading can reduce demands on the system for results that the user is not interested in while guaranteeing the instant availability of documents for a query permutation that the user is interested in.

Figure 13:
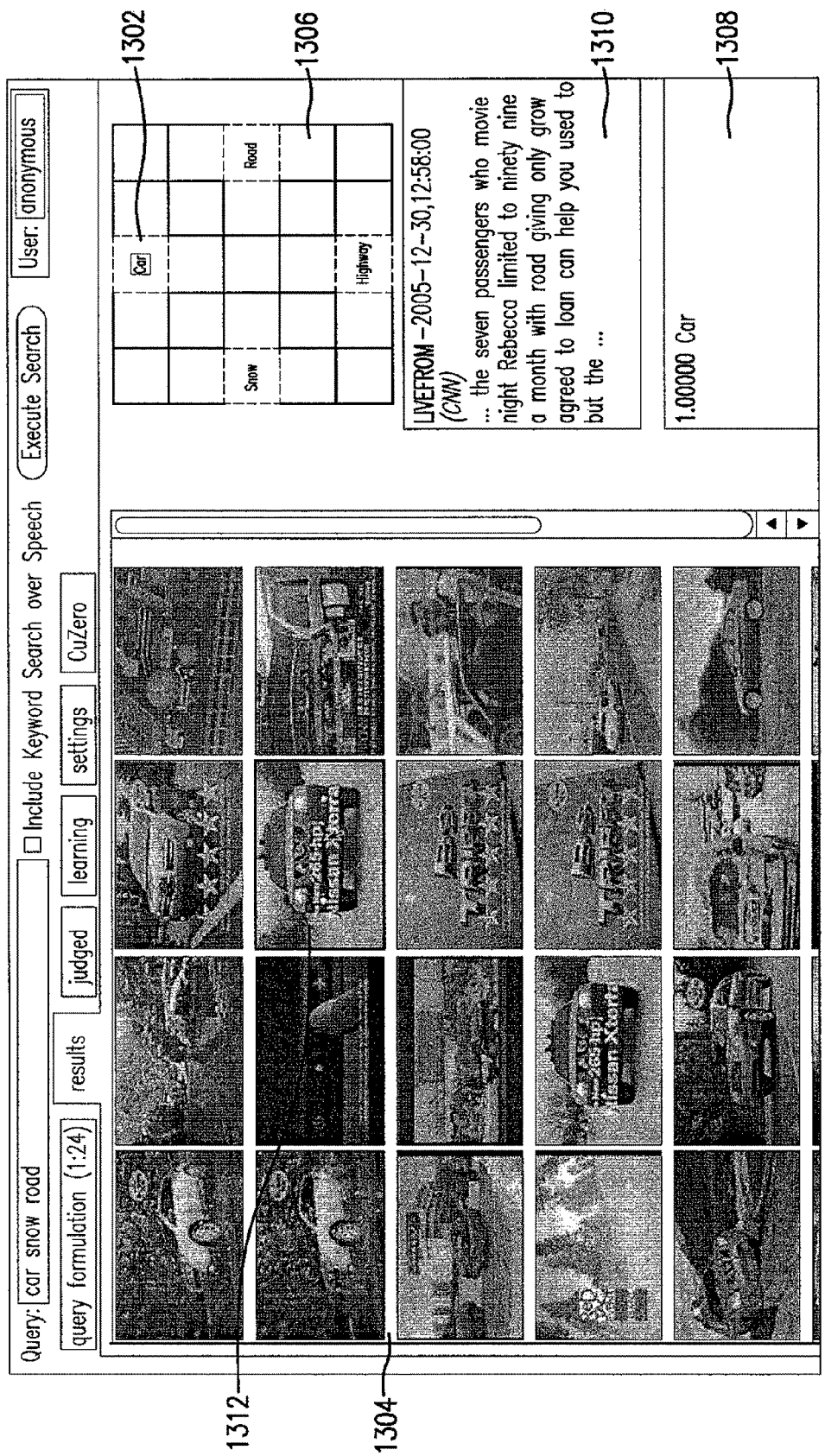
FIG. 13 illustrates an exemplary embodiment of a graphical user interface of the disclosed subject matter for displayed results with an anchor cell selected.

Referring now to FIG. 13, a graphical user interface screen is provided for an exemplary embodiment of the disclosed subject matter. FIG. 13 provides an interface screen for the displaying results stage 208 of FIG. 2. The selected cell 1302 is indicated by the square. The results for the selected cell 1302 are displayed in a separate real-time result exploration panel 1304. The simultaneous availability of both the navigation map 1306 and the result exploration panel 1304 allows the user to instantly switch between navigation for depth or breadth without breaking focus on the result exploration at hand. The concept relevance weight of the selected cell is indicated in another separate window 1308. Note that the concept relevance weight is one for the search anchor positioned at the selected anchor cell 1302 and zero for all other search anchors. A result detail panel 1310 displays additional information for a particular selected result 1312 which, in this exemplary embodiment, is selected by placement of the cursor over the result.

Figure 14:
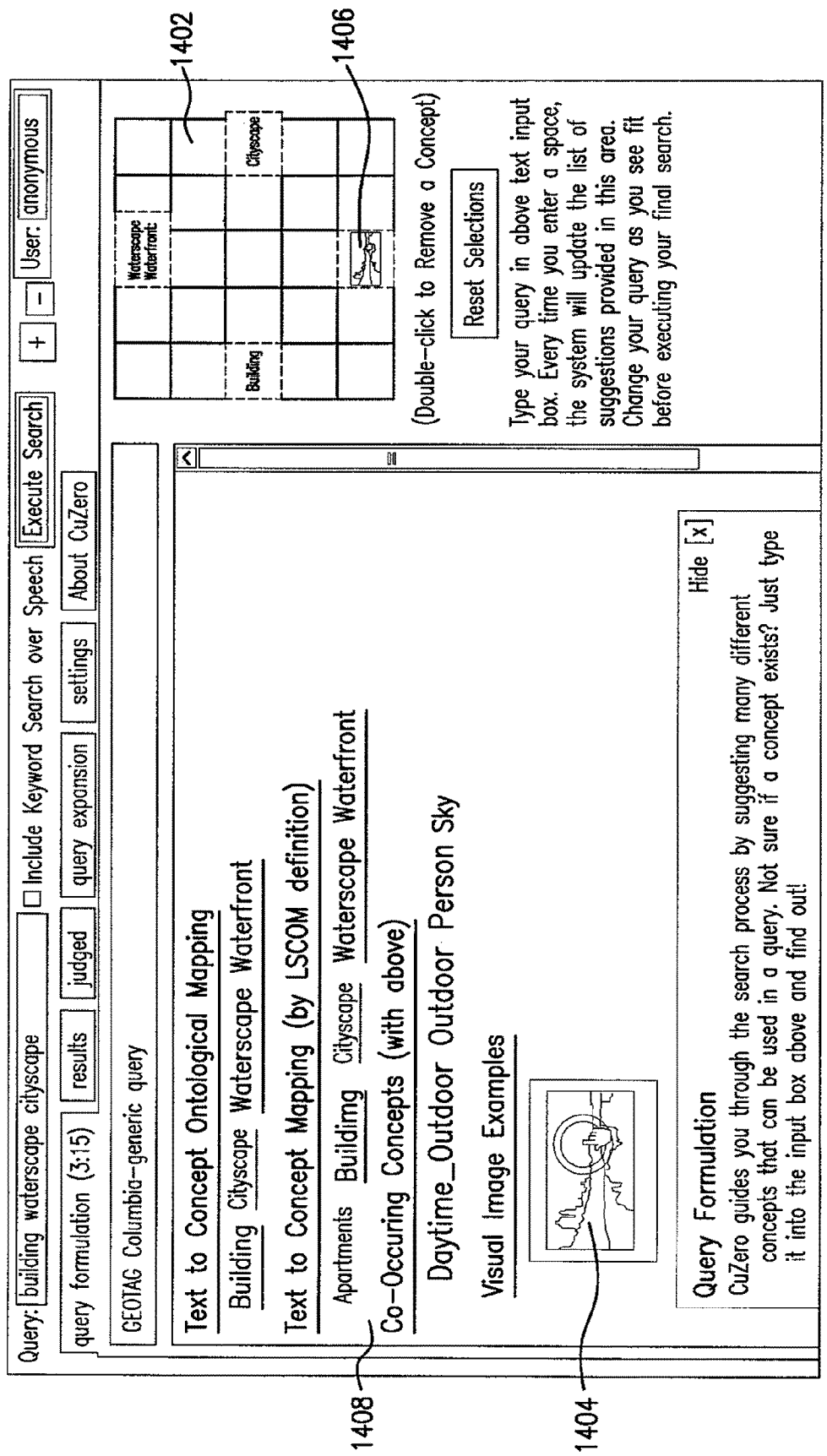
FIG. 14 illustrates an exemplary embodiment of the user interface of the disclosed subject matter where a visual image is used as an anchor.

FIG. 14 illustrates an exemplary embodiment of a user interface screen displayed when a concept other than a semantic concept is chosen as a search anchor. Notably, the search anchors are not limited to text, metadata, or search concepts, and can also include media such as images, video, audio cues, and the like. Scored search results from a previous query can also be used as a search anchor. The navigation map 1402 contains a search anchor based on a visual image 1406. The search anchor 1406 is selected by choosing the corresponding visual image example 1404 from the instant concept suggestion panel 1408. In one example, the visual image is added to the instant concept suggestion panel by performing a search and selecting a result. However, non-semantic concepts can be added to the instant concept suggestion panel or directly to the navigation map itself by any method known in the art, including selecting a saved image from a previous search, the use of an "Add" button, or by drag-and-drop interaction. When a non-semantic concept is used as a search anchor, all available features pertaining to that concept can be used. In another embodiment, the user can select what type of feature they want to use when, for example, an image is inserted as an anchor. Features which may be selected by the user can include, but are not limited to, color, texture, local similarity, and edge. Those having ordinary skill in the art will recognize that the system can be adapted to include a wide range of features.

Figure 15:
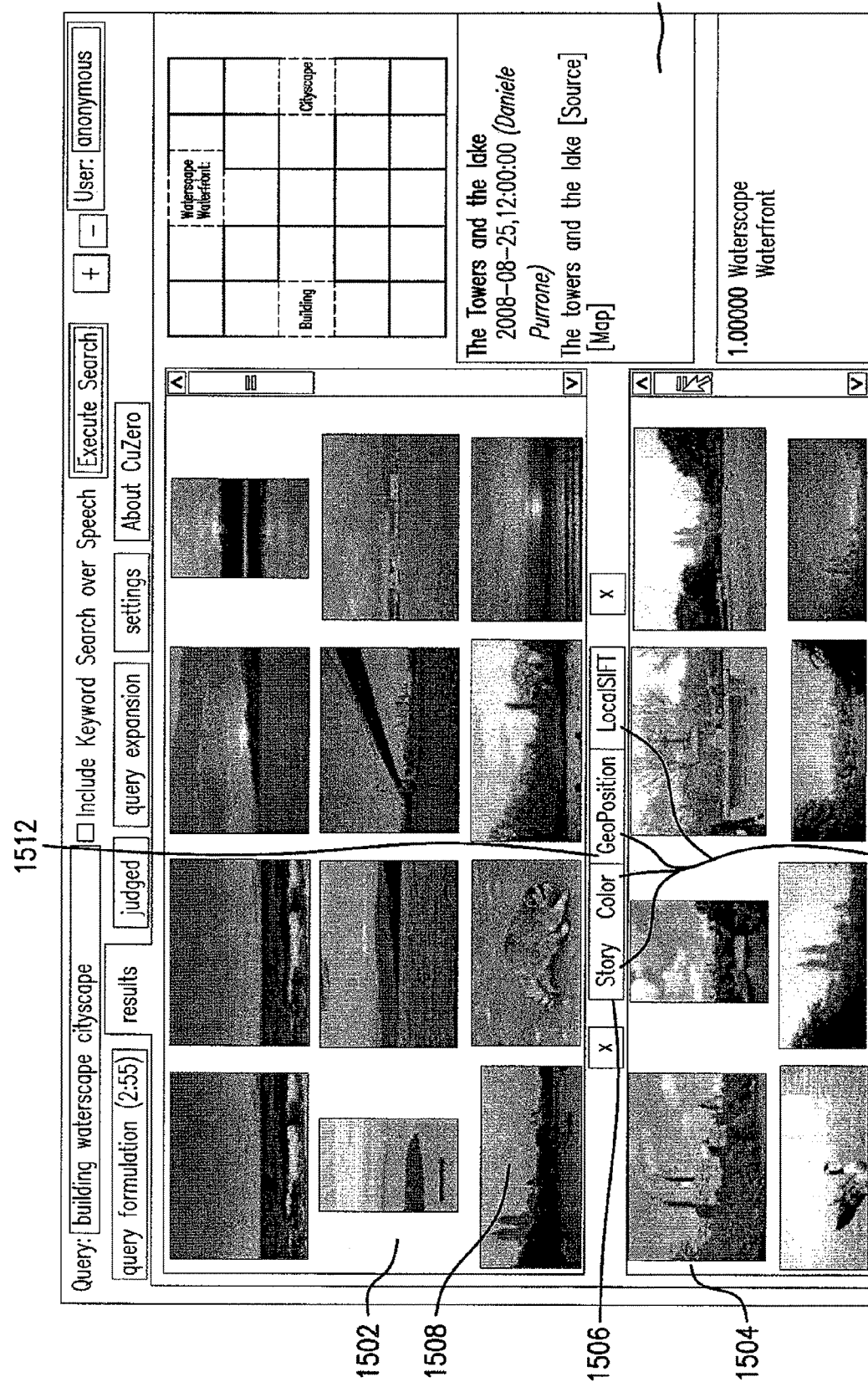
FIG. 15 illustrates an exemplary embodiment of the user interface of the disclosed subject matter which shows a secondary result exploration panel.

FIG. 15 illustrates an exemplary user interface screen utilizing a secondary result exploration panel. The display results are initially presented in the result exploration panel 1502. The user can browse through the documents and can select one of the documents by, for example, clicking on the image with a mouse. When the user selects a document in the result exploration panel 1502, a secondary result exploration panel 1504 can be displayed. The secondary result panel 1504 can contain documents related to the selected document. In the present example, the contents of the secondary result panel 1504 are controlled by the related feature panel 1506, which in FIG. 15 contains four different features 1514. In FIG. 15, document 1508 from the result exploration panel 1502 has been chosen. The selected document 1508 shows towers and a lake, as described in the result detail panel 1510. The result detail panel 1510 also includes a map. The documents displayed in the secondary result exploration panel 1504 are related to the selected document 1508 according to the GeoPosition button 1512 in the related feature panel 1506. This indicates that the source of all the documents in the secondary result exploration window 1504 are located at or near the same geographic position as the source for the selected document 1508 as defined by the map referenced in the result detail panel 1510. Those having skill in the art will recognize that a multitude of additional features can be included in the related feature panel 1506 for relating a selected document to a set of secondary results.

Figure 16:
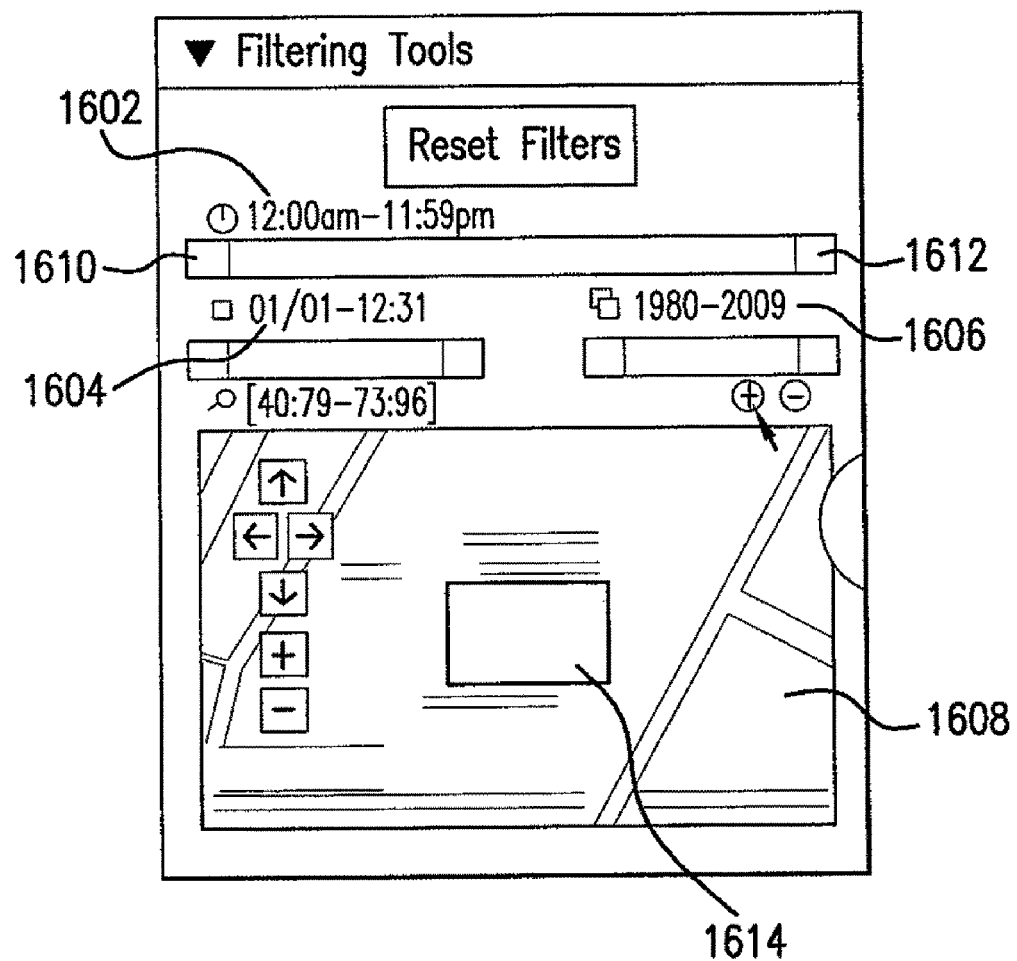
FIG. 16 illustrates the use of in-place filtering in connection with one embodiment of the disclosed subject matter.

FIG. 16 illustrates the use of in-place result filtering. In-place result filtering is another tool that can be used to explore a set of results associated with a selected cell. In-place result filtering allows the user to limit the displayed results based on information associated with the documents. This information can be metadata. For example, in FIG. 16, the in-place result filtering has sliding filters corresponding to time 1602, date 1604, year 1606, and a map corresponding to geographic location 1608. Each of the sliding filters has two sliders, the lower boundary slider 1610 and the upper boundary slider 1612, which are used to define the boundaries of the results to be displayed, The map contains a selection box 1614 that similarly sets the geographic boundaries or the results.

In another embodiment, the information used to limit the displayed results can be face information. Face filtering can allow a user to filter the results for any face information, such as the presence of large faces, the presence of a single face, the presence of multiple faces, or the presence of any faces. Those having ordinary skill in the art will recognize that other filters and further exploration methods can be used to filter the results in a similar manner.

Figure 17:
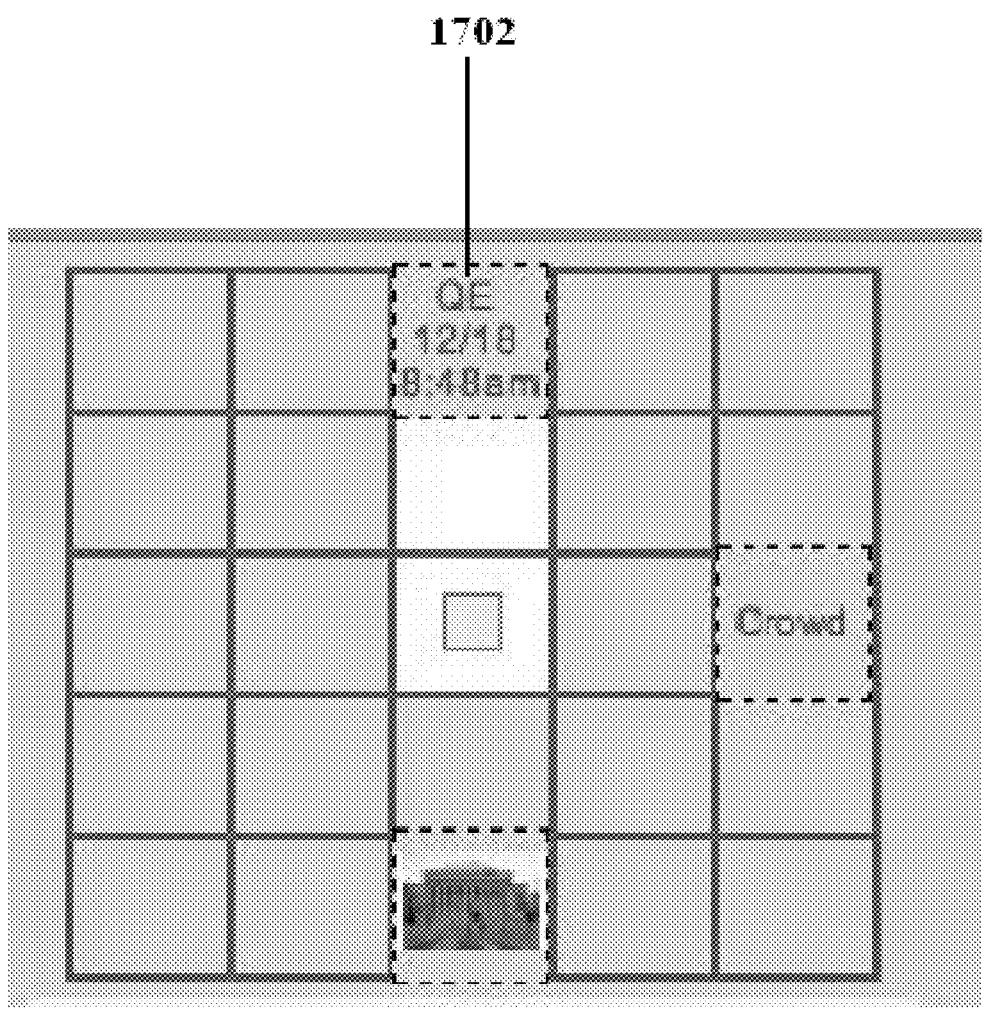
FIG. 17 illustrates the use of query expansion results as a search anchor in connection with one embodiment of the disclosed subject matter.

FIG. 17 illustrates the use of query expansion results as a search anchor. Query expansion can allow a user to see the most similar results according to the user's inputs. Once a set of results has been presented, the user can label a document. For example, a document can be labeled as either negative or positive. If the user labels a document as positive, the query expansion method can add a positive weight to the document relevance weight of each of the N nearest neighbors of the positively-labeled documents. If the user labels a document as a negative document, the query expansion method can add a negative weight to the document relevance weight of each of the N nearest neighbors of the negative document. In some embodiments, the magnitude of the weight added can be based on the proximity of a document to a labeled document, such that the weight added to the Mth nearest neighbor of a positively-labeled document is greater than the weight added to the (M+1)th nearest neighbor of the labeled document.

In another embodiment, the user can label the results relevant to a particular feature of a document for query expansion. For example, the user may select nearest neighbors using color features of the document and label those results as either negative or positive. Other features that can be labeled in this manner include texture, local similarity, modalities, and movement features such as curvatures or speed of path. Those having ordinary skill in the art will recognize that the system can be adapted to include a wide range of features. The query expansion method can then add a positive or negative weight to each of the N nearest neighbors of the document based on the particular feature.

Once the user has labeled a set of documents, the system can require the user to trigger the query expansion. For example, the user can be required to select a particular button using a mouse or to press a particular key on the keyboard. In another embodiment, query expansion can occur as soon as a document is labeled. The query expansion method can then generate a new set of results according to the new document relevance weights defined by the query expansion method and the user's labels. The query expansion results can be displayed in a query expansion window. The query expansion window can be a separate window. In other embodiments, the query expansion window can be a window that is displayed when the user selects a query expansion tab. The user may decide that the query expansion results are useful and choose to save the results for future access. In other embodiments, the query expansion results are saved automatically. The query expansion results can be saved as a list. For example, the list can include only the results that the user sees in the query expansion window. The list can be saved with a timestamp for unique identification. In other embodiments, the list can be named by the user. The query expansion results 1702 can then be used as a search anchor as shown in FIG. 17.

The foregoing merely illustrates the principles of the disclosed subject matter. Various modifications and alterations to the described embodiments will be apparent to those skilled in the art in view of the inventors' teachings herein. For example, a placement map 602 as in FIG. 6 can be displayed to the user for placement of the search anchors on a navigation map. Features of existing search systems, including finding similar or near-duplicate results and an inspection of speech transcripts from the content's original video, can be seamlessly integrated into the interface of the exemplary embodiments of the disclosed subject matter or a similar system. It will thus be appreciated that those skilled in the art will be able to devise numerous systems and methods which, although not explicitly shown or described herein, embody the principles of the disclosed subject matter and are thus within its spirit and scope.

We claim:

1. A computer-implemented method for dynamically and interactively searching a media database, comprising:
   (a) receiving one or more search anchors;
   (b) associating, using a processor, at least one of said one or more search anchors with at least one anchor cell on a navigation map;
   (c) populating at least one cell on the navigation map with one or more documents based at least in part on said associated search anchors wherein said populating comprises
      (i) computing, using one or more processors, a concept relevance weight for said at least one cell on said navigation map, said concept relevance weight being based at least in part on said associated search anchors; and
      (ii) populating said at least one cell with one or more documents from a database according to said concept relevance weight; and
   (d) outputting at least one of said documents assigned to said at least one cell on the navigation map.

2. The computer-implemented method of claim 1, wherein said outputting comprises displaying said at least one of said documents assigned to a selected cell on a display.

3. The computer-implemented method of claim 1, wherein said outputting comprises transmitting said at least one of said documents to a second computing device.

4. The computer-implemented method of claim 1, wherein said populating comprises:
   (a) populating said at least one cell with a first set of one or more documents according to a first concept relevance weight;
   (b) receiving an indication that at least one of said associated search anchors have been altered;
   (c) computing a second concept relevance weight for said at least one cell based on said altered search anchors; and
   (d) re-populating said at least one cell with a second set of one or more documents according to said second concept relevance weight only if a cumulative weight change of said at least one cell exceeds a pre-determined stability threshold.

5. The computer-implemented method of claim 1, wherein said receiving comprises:
   (a) receiving a text query;
   (b) outputting a plurality of concepts based on said text query; and
   (c) receiving a selection of a concept from said plurality of concepts.

6. The computer-implemented method of claim 1, wherein said computing comprises:
   (a) positioning said associated search anchors on said navigation map; and
   (b) computing said concept relevance weight for said at least one cell on said navigation map based at least in part on the position of said associated search anchors on said navigation map.

7. The computer-implemented method of claim 1, wherein said populating comprises:
   (a) computing a total relevance score for each of a plurality of documents according to said concept relevance weight and a document relevance score;
   (b) prioritizing a pre-determined number of said plurality of documents for said at least one cell;
   (c) identifying a remainder group of documents comprising a subsection of said plurality of documents not included in said pre-determined number of prioritized documents; and
   (d) populating said cell with an ordered plurality of documents, wherein said pre-determined number of prioritized documents are followed by said remainder group of documents.

8. A non-transitory computer-readable medium, encoded with a computer program that includes computer executable instructions for dynamically and interactively searching a media database, which when executed causes a processor to:
   (a) receive one or more search anchors;
   (b) associate at least one of said one or more search anchors with anchor cells on a navigation map;
   (c) populate at least one cell on the navigation map with one or more documents based at least in part on said associated search anchors; and
   (d) output at least one of said documents assigned to at least one cell on the navigation map,
wherein the computer program further causes the processor to store said at least one cell in memory as a super-anchor.

9. A computer-implemented method, for dynamically and interactively searching a media database, comprising:
   (a) receiving one or more search anchors;
   (b) associating, using a processor, at least one of said one or more search anchors with at least one anchor cell on a navigation map;
   (c) populating at least one cell on the navigation map with one or more documents based at least in part on said associated search anchors;
   (d) outputting at least one of said documents assigned to said at least one cell on the navigation map; and
   (e) storing a selected cell in memory as a super-anchor.

10. A computer-implemented method, for dynamically and interactively searching a media database, comprising:
   (a) receiving one or more search anchors;
   (b) associating, using a processor, at least one of said one or more search anchors with at least one anchor cell on a navigation map;
   (c) populating at least one cell on the navigation map with one or more documents based at least in part on said associated search anchors; and
   (d) transmitting said at least one of said documents to a second computing device, wherein said at least one of said documents is transmitted for each cell on said navigation map according to a cell priority list.

11. A system for dynamically and interactively searching a media database, comprising:
  (a) an interface for receiving one or more search anchors;
  (b) one or more processors, coupled to said interface, for associating at least one of said one or more search anchors with at least one anchor cell on a navigation map and for populating at least one cell with one or more documents based at least in part on said associated search anchors; and
  (c) a display, coupled to said one or more processors, for displaying at least one of said documents assigned to said at least one cell on the navigation map,
wherein said one or more processors are configured to compute a concept relevance weight for said at least one cell based at least in part on said associated search anchors and populate said at least one cell with said one or more documents from a database according to said concept relevance weight.

12. The system of claim 11 wherein said interface is configured to receive a search trigger and a selected cell, and wherein said display is configured to display said at least one of said documents assigned to said selected cell.

13. The system of claim 11 wherein said interface is configured to receive a text query and receive a selection of a concept from a plurality of concepts, and said display is configured to display said plurality of concepts based on said text query.

14. The system of claim 11, wherein said one or more processors are configured to position said associated search anchors on said navigation map and compute said concept relevance weight for said at least one cell based at least in part on the position of said associated search anchors on said navigation map.

15. The system of claim 11 wherein said one or more processors are configured to compute a total relevance score for each of a plurality of documents according to said concept relevance weight and a document relevance score, prioritize a pre-determined number of said plurality of documents for said at least one cell, identify a remainder group of documents comprising a subsection of said plurality of documents not included in said pre-determined number of prioritized documents, and populate said at least one cell with an ordered plurality of documents, wherein said pre-determined number of prioritized documents are followed by said remainder group of documents.

16. A system of for dynamically and interactively searching a media database, comprising:
  (a) an interface for receiving one or more search anchors;
  (b) one or more processors, coupled to said interface, for associating at least one of said one or more search anchors with at least one anchor cell on a navigation map and for populating at least one cell with one or more documents based at least in part on said associated search anchors;
  (c) a display, coupled to said one or more processors, for displaying at least one of said documents assigned to said at least one cell on the navigation map; and
  (d) a memory device for storing said at least one cell as a super-anchor.

17. A non-transitory computer-readable medium encoded with a computer program that includes computer executable instructions for dynamically and interactively searching a media database, which when executed causes a processor to:
  (a) receive one or more search anchors;
  (b) associate at least one of said one or more search anchors with anchor cells on a navigation map;
  (c) populate at least one cell on the navigation map with one or more documents based at least in part on said associated search anchors, comprising:
    (i) compute a concept relevance weight for said at least one cell on said navigation map, said concept relevance weight being based at least in part on said associated search anchors; and
    (ii) populate said at least one cell with one or more documents from a database according to said concept relevance weight; and
  (d) output at least one of said documents assigned to at least one cell on the navigation map.

18. The non-transitory computer-readable medium of claim 17, wherein the computer program causes the processor to:
  (e) receive a search trigger;
  (f) receive a selected cell; and
  (g) output said at least one of said documents assigned to said selected cell.

19. The non-transitory computer-readable medium of claim 17, wherein the computer program causes the processor to display said at least one of said documents assigned to a selected cell on a display screen.

20. The non-transitory computer-readable medium of claim 17, wherein the computer program causes the processor to transmit said at least one of said documents to a second computing device.

21. The non-transitory computer-readable medium of claim 17, wherein the computer program causes the processor to:
  (g) compute a total relevance score for each of a plurality of documents according to said concept relevance weight and a document relevance score;
  (h) prioritize a pre-determined number of said plurality of documents for said at least one cell;
  (i) identify a remainder group of documents comprising a subsection of said plurality of documents not included in said pre-determined number of prioritized documents; and
  (j) populate said at least one cell with an ordered plurality of documents, wherein said pre-determined number of prioritized documents are followed by said remainder group of documents.

22. The non-transitory computer-readable medium of claim 17, wherein the computer program causes the processor to:
  (e) receive a text query;
  (f) output a plurality of concepts based on said text query; and
  (g) receive a selection of a concept from said plurality of concepts.

23. The non-transitory computer-readable medium of claim 17, wherein the computer program causes the processor to:
  (g) position said associated search anchors on said navigation map; and
  (h) compute said concept relevance weight for said at least one cell on said navigation map based at least in part on the position of said associated search anchors on said navigation map.

* * * * *